US012638663B2

(12) United States Patent
Johnson et al.

(10) Patent No.: US 12,638,663 B2
(45) Date of Patent: May 26, 2026

(54) FOLDED OPTICAL SYSTEM WITH INPUT CENTRATION SENSING AND OUTPUT ANGLE SENSING

(71) Applicant: BAE SYSTEMS Information and Electronic Systems Integration Inc., Nashua, NH (US)

(72) Inventors: Chapin T. Johnson, Nashua, NH (US); Nicholas Bergstrom, Hudson, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 290 days.

(21) Appl. No.: 18/428,278

(22) Filed: Jan. 31, 2024

(65) Prior Publication Data

US 2025/0244567 A1    Jul. 31, 2025

(51) Int. Cl.
*G02B 5/08*        (2006.01)
*G01B 11/26*       (2006.01)
*G02B 7/182*       (2021.01)
*G02B 17/02*       (2006.01)

(52) U.S. Cl.
CPC ............ *G02B 17/023* (2013.01); *G01B 11/26* (2013.01); *G02B 7/1827* (2013.01)

(58) Field of Classification Search
CPC .. G02B 17/023; G02B 7/1827; G02B 7/1822; G02B 7/1821; G01B 11/26
See application file for complete search history.

(56) References Cited

U.S. PATENT DOCUMENTS 8,531,657 B2    9/2013  Fasse et al.
2013/0070238 A1*  3/2013  Fasse ...................... G01S 7/486
                                      356/138

* cited by examiner

*Primary Examiner* — Euncha P Cherry

(74) *Attorney, Agent, or Firm* — Gary McFaline

(57)              ABSTRACT

An apparatus includes a first mirror reflecting an input light beam as an intermediate light beam, a second mirror reflecting the intermediate light beam as an output light beam, an angle sensor measuring an angle of the output light beam, and a centration sensor measuring a centration of the input light beam. The apparatus further includes a controller configured to (i) based on measurements from the centration and angle sensors, determine an input path of the input light beam, (ii) based on the determined input path of the input light beam and a target output path, determine a target intermediate path, and (iii) based on the target intermediate path, determine target orientations of the first and second mirrors, such that the first and second mirrors, when steered to the respective target orientations, reflect the input light beam along the target output path.

20 Claims, 15 Drawing Sheets

Centration sensing plane 112, and centration sensor 113

100

Input plane 120

Input path 301 (input light beam 301a)

106

302 (302a)

108

Output plane 124

Output path 303 (output light beam 303a)

Angle measurement 147 $\alpha_{sensed}$

Angle sensing plane 116, and angle sensor 117

Angle measurement 147 $\alpha_{sensed}$

Controller 120

Centration sensing plane 112, and centration sensor 113

100

Input path 301 (input light beam 301a)

Input plane 120

106

302 (302a)

108

Output plane 124

Output path 303 (output light beam 303a)

$\alpha_{out}$

Angle measurement 147 $\alpha_{sensed}$

Angle sensing plane 116, and angle sensor 117

Angle measurement 147
$\alpha_{sensed}$

Controller 120 (determines $\alpha_{out}$)

Centration sensing plane 112, and centration sensor 113

Input plane 120

106

100

Other output paths 333a, 33b, 33c that have the same angle measurements $\alpha_{out}$

108

Output plane 124

$\alpha_{out}$

Actual output path 303 (output light beam 303a)

Angle sensing plane 116, and angle sensor 117

Angle measurement 147

$\alpha_{sensed}$

Controller 120

Centration sensing plane 112, and centration sensor 113

100

$\alpha_{in}$

Input plane 120

$\alpha_{intermediate}$

106

108

Other output paths 333a, 33b, 33c that have the same angle measurements $\alpha_{out}$ Output plane 124

Actual output path 303 (output light beam 303a)

$\alpha_{out}$

Angle sensing plane 116, and angle sensor 117

Angle measurement 147

$\alpha_{sensed}$

Controller 120 (determines $\alpha_{in}$)

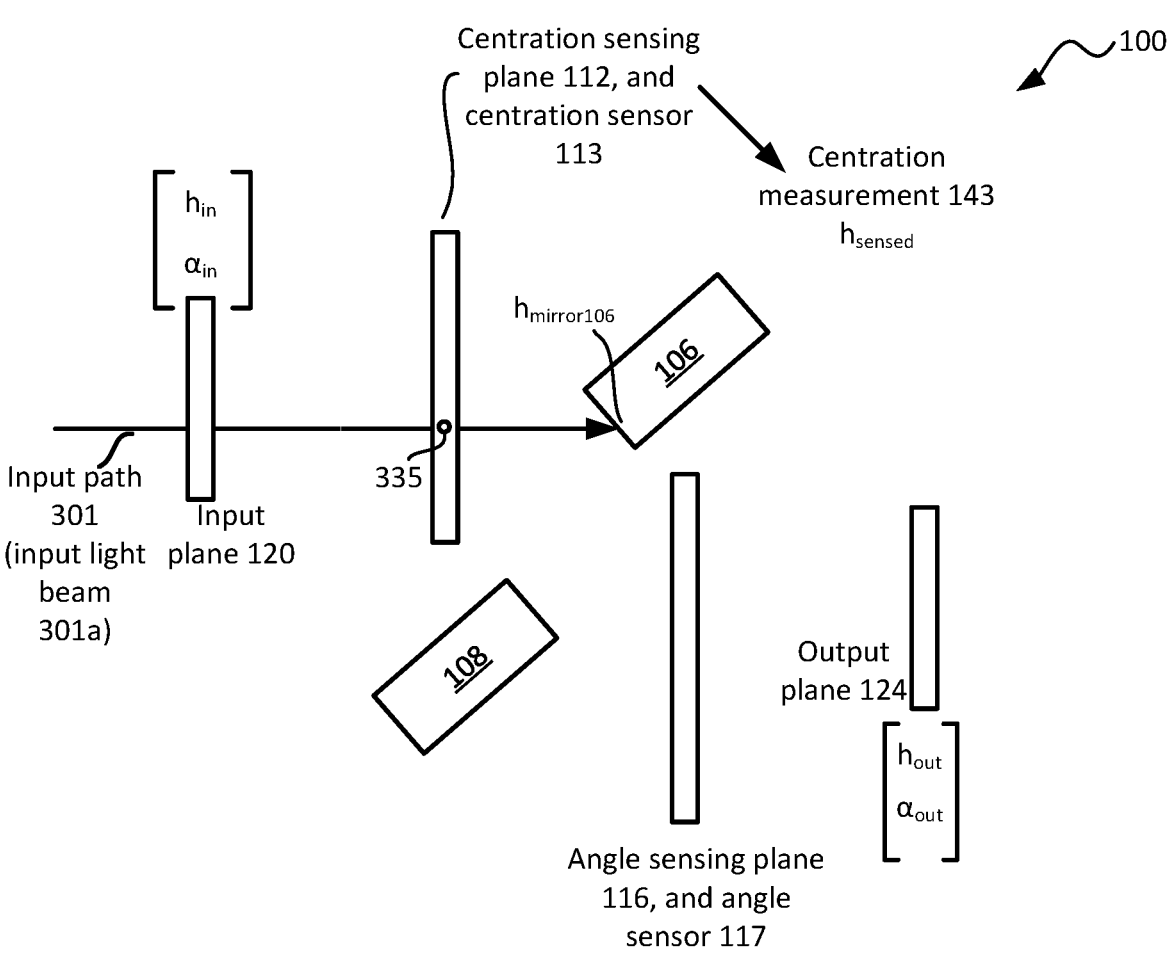

Centration sensing plane 112, and centration sensor 113

Centration measurement 143
$h_{sensed}$

100

$h_{mirror106}$ $\begin{bmatrix} h_{in} \\ \alpha_{in} \end{bmatrix}$

Input path 301
(input light beam 301a)

Input plane 120

335

106

108

Output plane 124

$\begin{bmatrix} h_{out} \\ \alpha_{out} \end{bmatrix}$

Angle sensing plane 116, and angle sensor 117

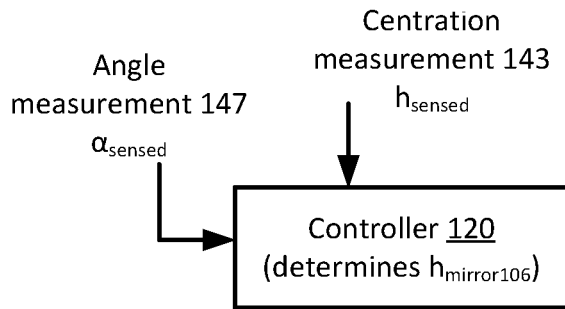

Angle measurement 147
$\alpha_{sensed}$

Centration measurement 143
$h_{sensed}$

Controller 120
(determines $h_{mirror106}$)

FIG. 3H

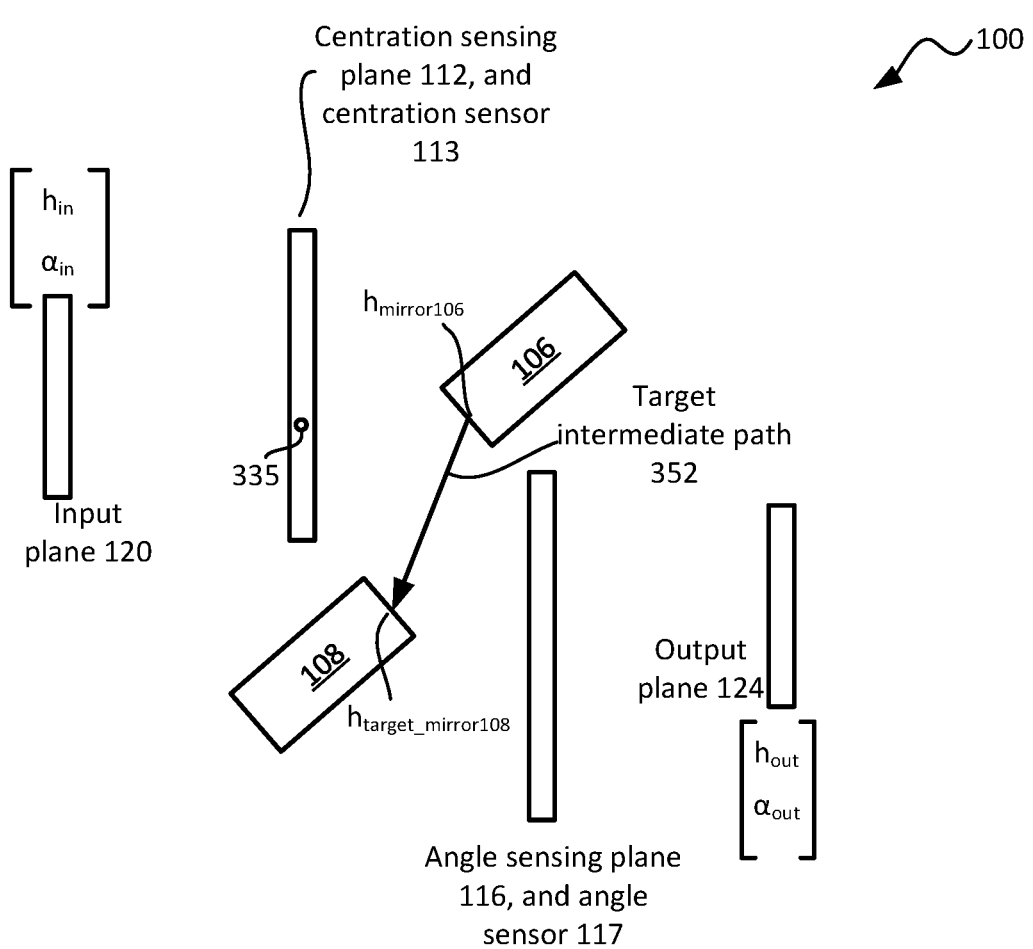

Centration sensing plane 112, and centration sensor 113

~100

$h_{mirror106}$

Input plane 120

335

Target intermediate path 352

Output plane 124

Angle sensing plane 116, and angle sensor 117

$h_{target\_mirror108}$ $\begin{bmatrix} h_{in} \\ \alpha_{in} \end{bmatrix}$ $\begin{bmatrix} h_{out} \\ \alpha_{out} \end{bmatrix}$

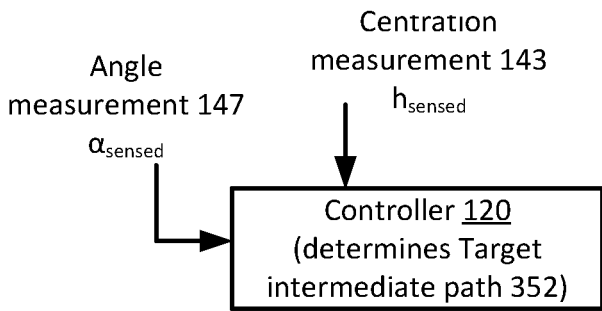

Angle measurement 147

$\alpha_{sensed}$

Centration measurement 143

$h_{sensed}$

Controller 120
(determines Target intermediate path 352)

FIG. 3J

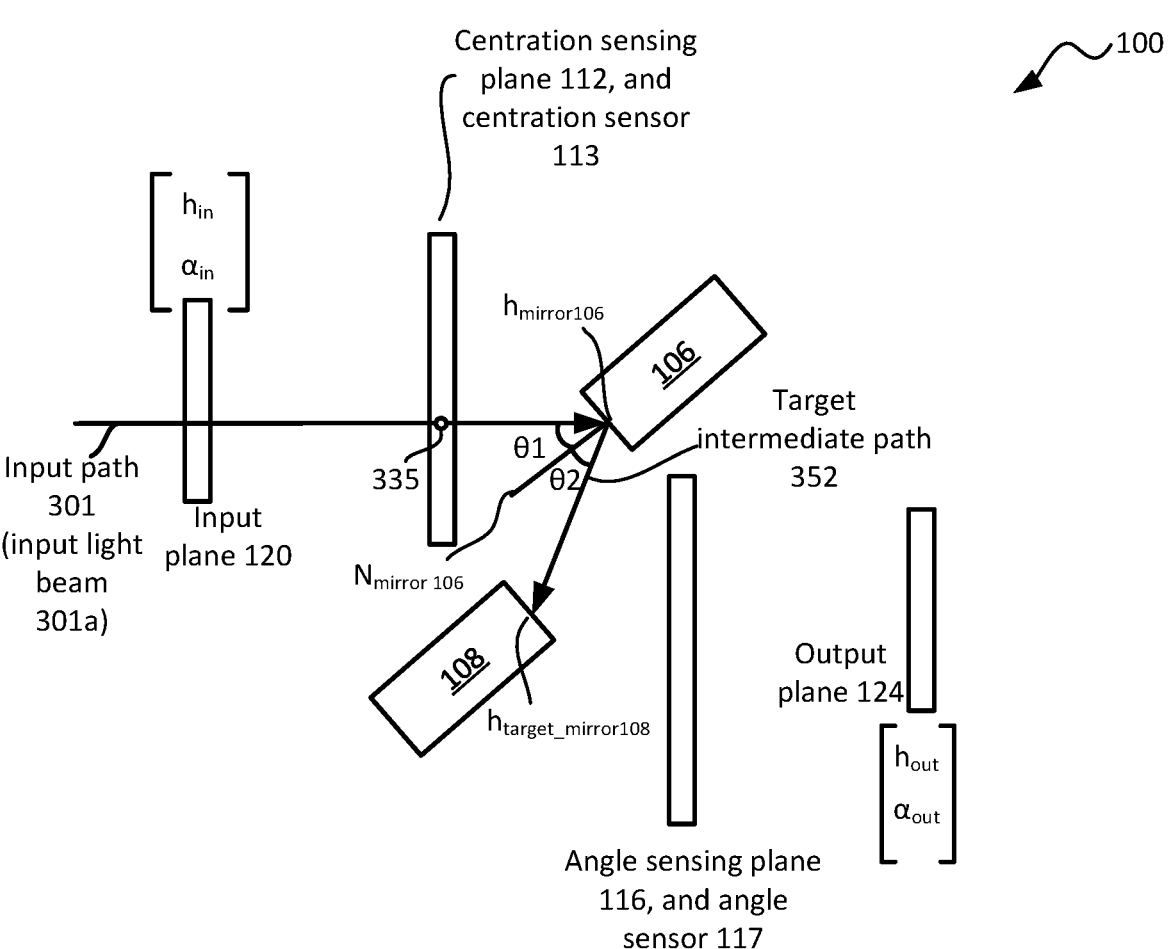

Centration sensing plane 112, and centration sensor 113

100

Input path 301 (input light beam 301a)

Input plane 120

$h_{in}$
$\alpha_{in}$ $h_{mirror106}$

106

$\theta 1$
$\theta 2$

335

$N_{mirror\ 106}$

Target intermediate path 352

108

$h_{target\_mirror108}$

Output plane 124

$h_{out}$
$\alpha_{out}$

Angle sensing plane 116, and angle sensor 117

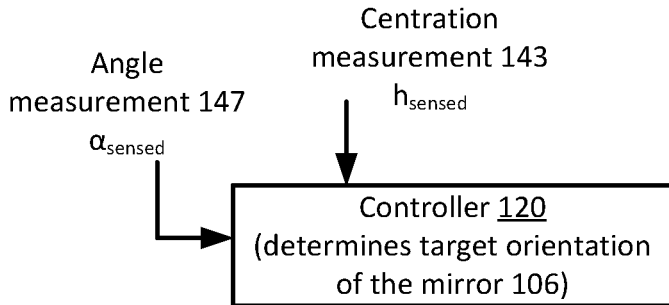

Angle measurement 147
$\alpha_{sensed}$

Centration measurement 143
$h_{sensed}$

Controller 120
(determines target orientation of the mirror 106)

FIG. 3K

FOLDED OPTICAL SYSTEM WITH INPUT CENTRATION SENSING AND OUTPUT ANGLE SENSING

STATEMENT OF GOVERNMENT INTEREST

This invention was made with United States Government assistance under Contract No. 19 C 8906. The United States Government has certain rights in this invention.

FIELD OF DISCLOSURE

The present disclosure relates to folded optical systems, and more particularly to a folded optical system with input centration sensing and output angle sensing.

BACKGROUND

In an optical system, a centration of a light beam with respect to an imaginary two-dimensional plane refers to a position on the plane through which the light beam passes. Standard centration control systems require direct knowledge of the output centration.

BRIEF DESCRIPTION OF THE DRAWINGS

FIGS. 3A, 3B, 3C, 3D, 3E, 3F, 3G, 3H, 3I, 3J, 3K, 3L, and 3M illustrate the optical system of FIG. 1, and collectively describe various processes of the method of FIG. 2, in accordance with an embodiment of the present disclosure.

Figure 1:
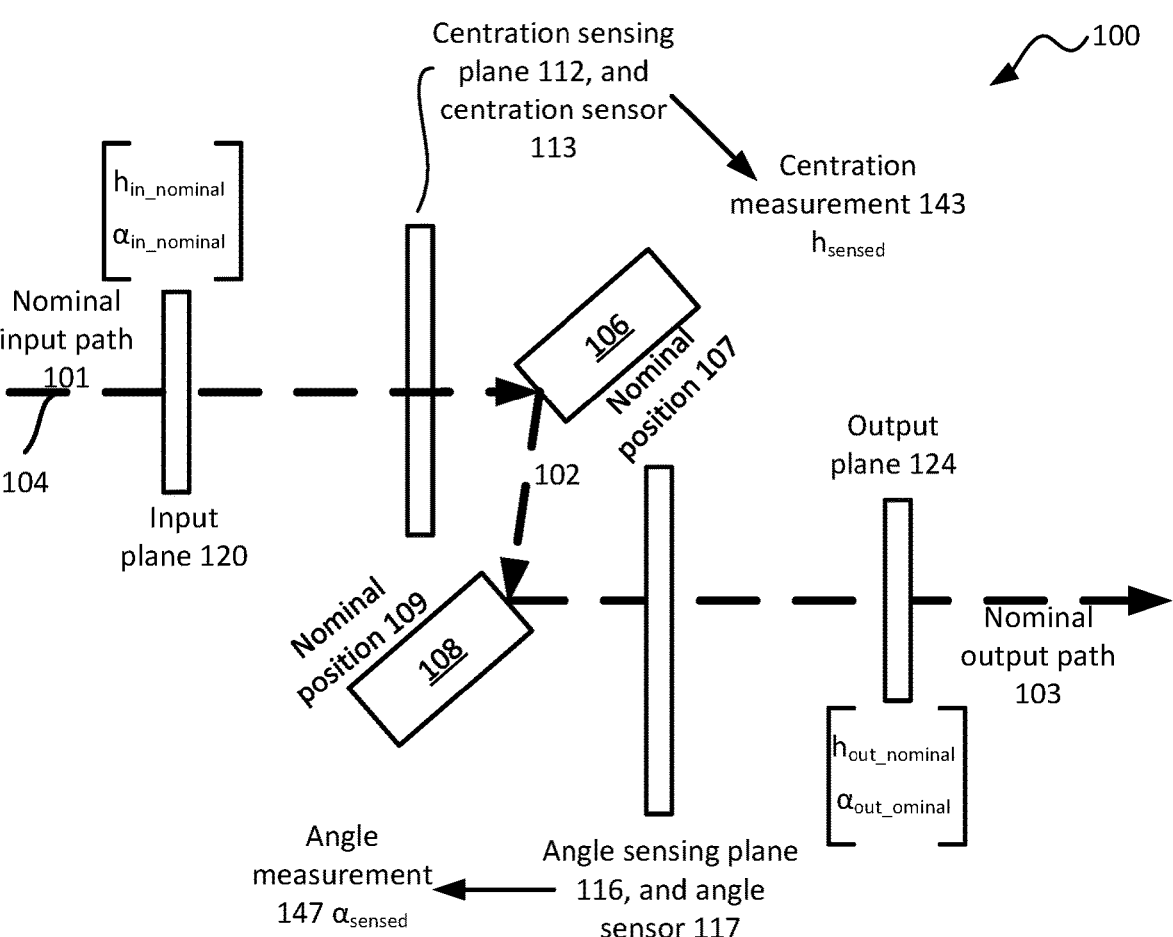
FIG. 1 illustrates a folded optical system configured with input centration sensing and output angle sensing, in accordance with an embodiment of the present disclosure.
Figure 1:
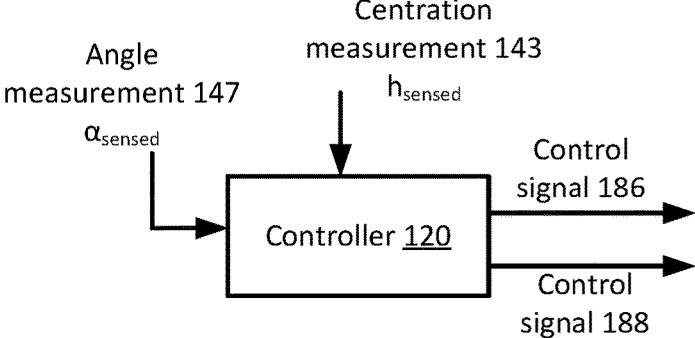

Although the following Detailed Description will proceed with reference being made to illustrative embodiments, many alternatives, modifications, and variations thereof will be apparent to those skilled in the art.

DETAILED DESCRIPTION

Techniques are described for controlling a folded optical system configured with input centration sensing and output angle sensing. In an example, an optical system includes (i) a first mirror and a second mirror, (ii) a centration sensor within an input path of the optical system, and (iii) an angle sensor within an output path of the optical system. An input beam is reflected as an intermediate light beam by the first mirror, and the second mirror reflects the intermediate light beam as an output light beam. The centration sensor is configured to measure a centration of the input light beam, and the angle sensor is configured to measure an angle of the output light beam. The optical system may further include a controller configured to control respective orientations of the first and second mirrors to steer the output light beam to a given target location. In an example, the controller steers or otherwise controls the first and second mirrors, such that the output light beam follows a target output path. In one such embodiment, for instance, the controller is configured to: determine, based at least in part on measurements from the centration sensor and the angle sensor, an input path of the input light beam; determine, based at least in part on the determined input path of the input light beam and a target output path, a target intermediate path; and determine, based at least in part on the target intermediate path, target orientations of the first mirror and second mirror. In this manner, the first and second mirrors, when controlled to the respective target orientations by the controller, reflect or otherwise steer the input light beam along the target output path. No direct knowledge of the output centration is required. Numerous embodiments and applications will be apparent in light of this disclosure.

General Overview

Techniques are described herein for controlling a folded (multi-mirror) optical system having a centration sensor within an input path and an angle sensor within an output path, wherein a controller causes the mirrors to steer an output light beam of the optical system along a target output path.

In an example, the optical system comprises a first mirror and a second mirror. The first mirror is configured to receive an input light beam, and reflect the input light beam as an intermediate light beam. The second mirror of is configured to receive the intermediate light beam, and reflect the intermediate light beam as an output light beam. In one example, the centration sensing plane may be within an input path to the first mirror, and the angle sensor may be within an output path from the second mirror. In another example, the centration sensing plane may lie anywhere within the optical system (e.g., in an intermediate path or the output path). Note that the centration sensor may be proximal to, or distal to the centration sensing plane (for example, the centration sensor may be located anywhere, and be sensing a location of the beam at the centration sensing plane). In an example, the two mirrors, in combination, steer or otherwise propagate the light beam in a folded path that is "Z" shaped or "S" shaped. Such a system may be referred to herein as a Z-fold optical system.

In some such embodiments, the input plane of the system may be different from the centration sensing plane of the system, and various measurements with respect to the centration sensing plane may be converted to measurements with respect to the input plane. Likewise, the output plane of the system may be different from the angle sensing plane of the system, and various measurements with respect to the angle sensing plane may be converted to measurements with respect to the output plane. A nominal path of the light beam, and nominal positions of the first and second mirrors are pre-defined, where various centration and angle measurements are taken relative to these nominal parameters. For example, a centration and angle of a nominal light beam with respect to the input plane is assumed to be zero, and similarly, a centration and angle of the nominal light beam with respect to the output plane is assumed to be zero.

A section of the optical system through which a light beam propagates to the first mirror is referred to as an input side, and the light beam incident on the first mirror is referred to as an input light beam. A section of the system through which a light beam propagates between the first and second mirrors is referred to as an intermediate side, and the corresponding light beam is referred to as an intermediate light beam. A section of the system through which a light beam is reflected from the second mirror is referred to as an output side, and the corresponding light beam is referred to as an output light beam.

In one embodiment, the controller of the system is configured to steer the first and second mirrors, such that the output light beam of the optical system tracks the target output path. For example, when an input light beam is received at the first mirror, the controller may not have control over the input path of the input light beam to the first mirror. However, the controller can appropriately steer reflecting surfaces of the first and second mirrors, such that the output light beam reflected by the second mirror tracks the target output path.

Figure 3A:
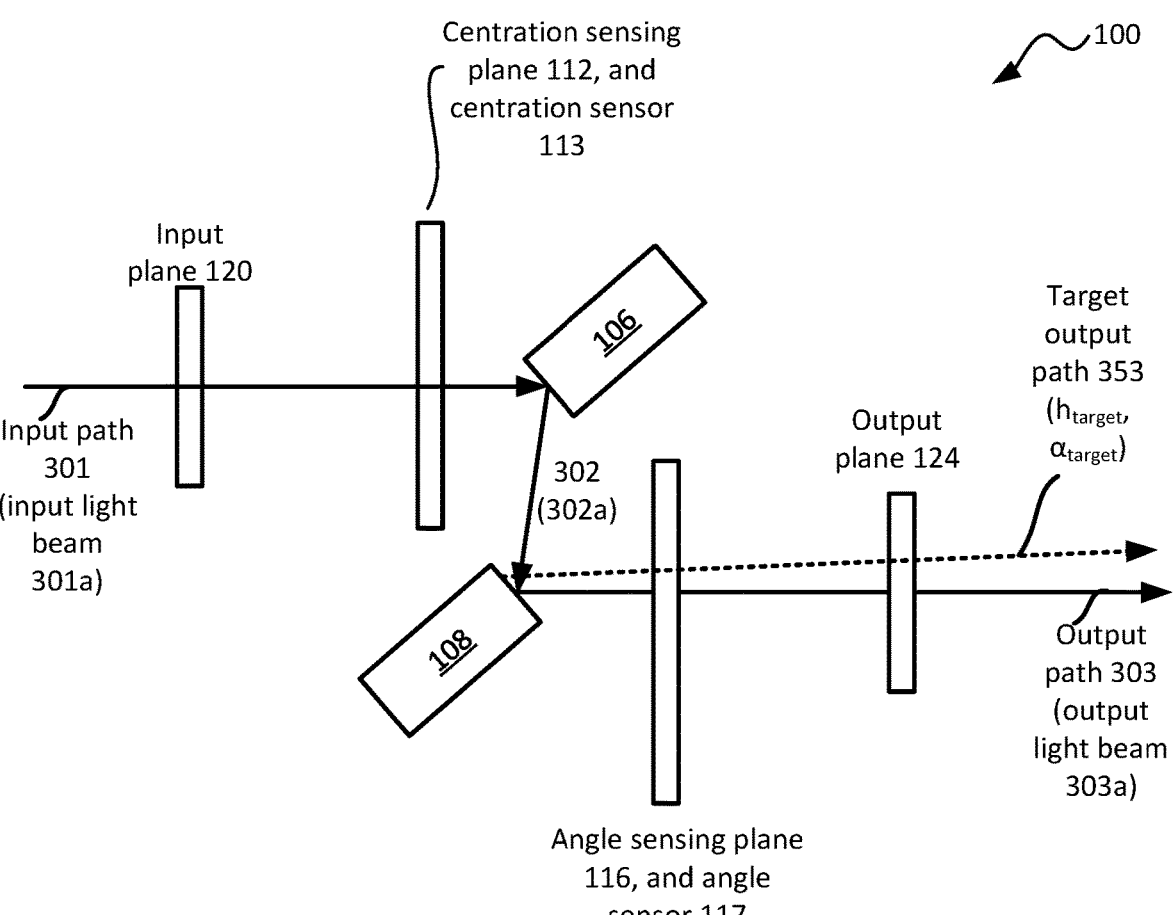
Figure 3B:
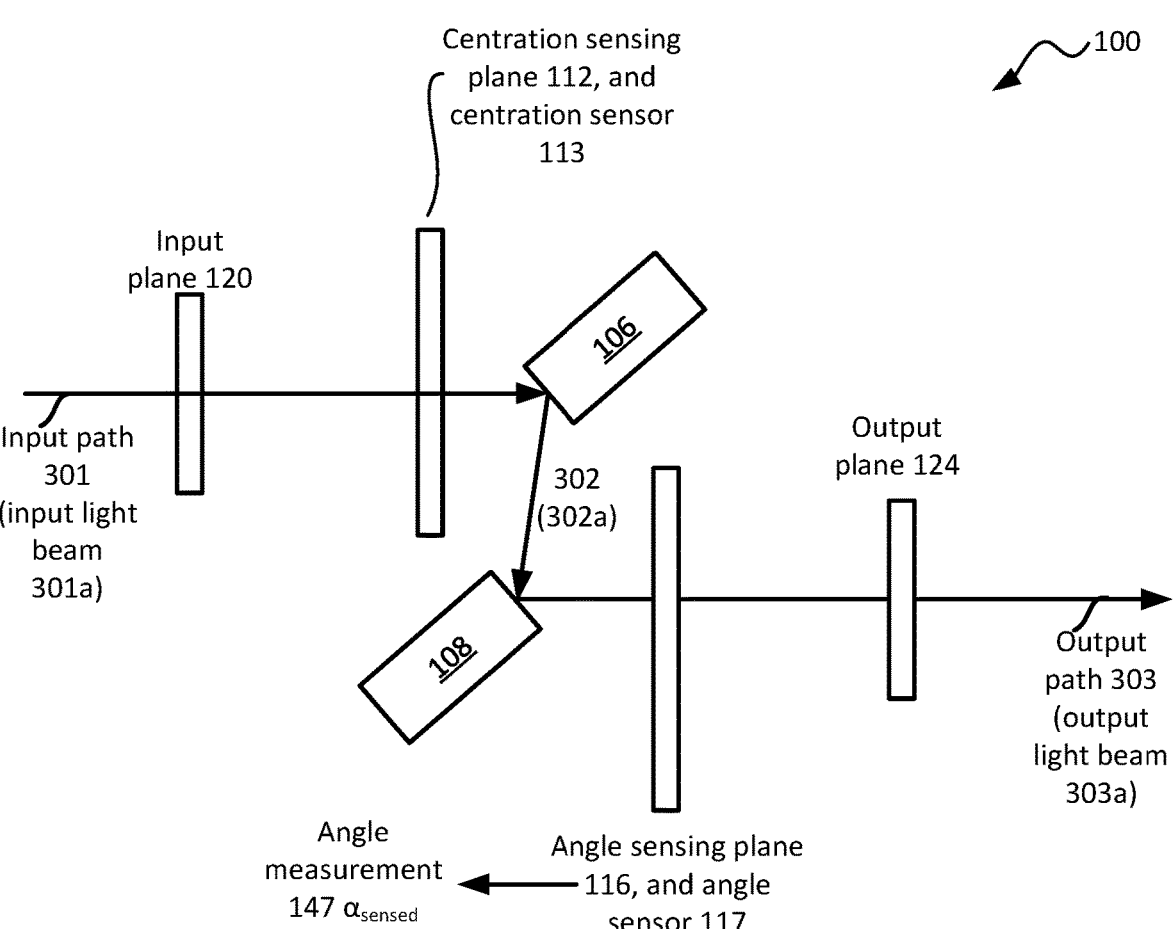
Figure 3B:
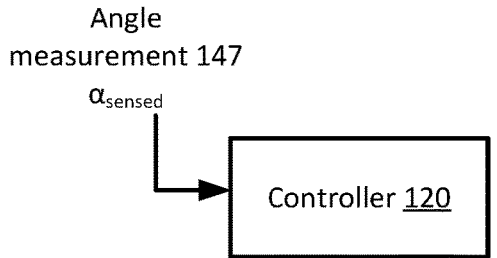

As will be described in further detail below, the angle sensor outputs angle measurement $\alpha_{sensed}$ of the output light beam with respect to the angle sensing plane, which is received by the controller (e.g., see FIG. 3B). The controller converts the angle measurement $\alpha_{sensed}$ (which is with respect to the angle sensing plane) to angle measurement $\alpha_{out}$ of the output light beam (which is with respect to the output plane), as will be described in further detail below. Subsequently, the controller determines, from the angle measurement $\alpha_{out}$ of the output light beam with respect to the output plane, angle measurement $\alpha_{in}$ of the input light beam with respect to the input plane. For example, to solve for the angle measurement $\alpha_{in}$ of the input light beam with respect to the input plane, the controller determines a reverse propagation of the light beam from the output side to the input side, to determine an angle of the reverse light beam with respect to the input plane, and then changes a sign of the determined angle to determine the angle measurement $\alpha_{in}$ of the input light beam with respect to the input plane. Subsequently, the controller receives centration measurement $h_{sensed}$ of the input light beam with respect to the centration sensing plane, and converts the centration measurement $h_{sensed}$ with respect to the centration sensing plane to centration measurement $h_{in}$ with respect to the input plane.

Figure 3C:
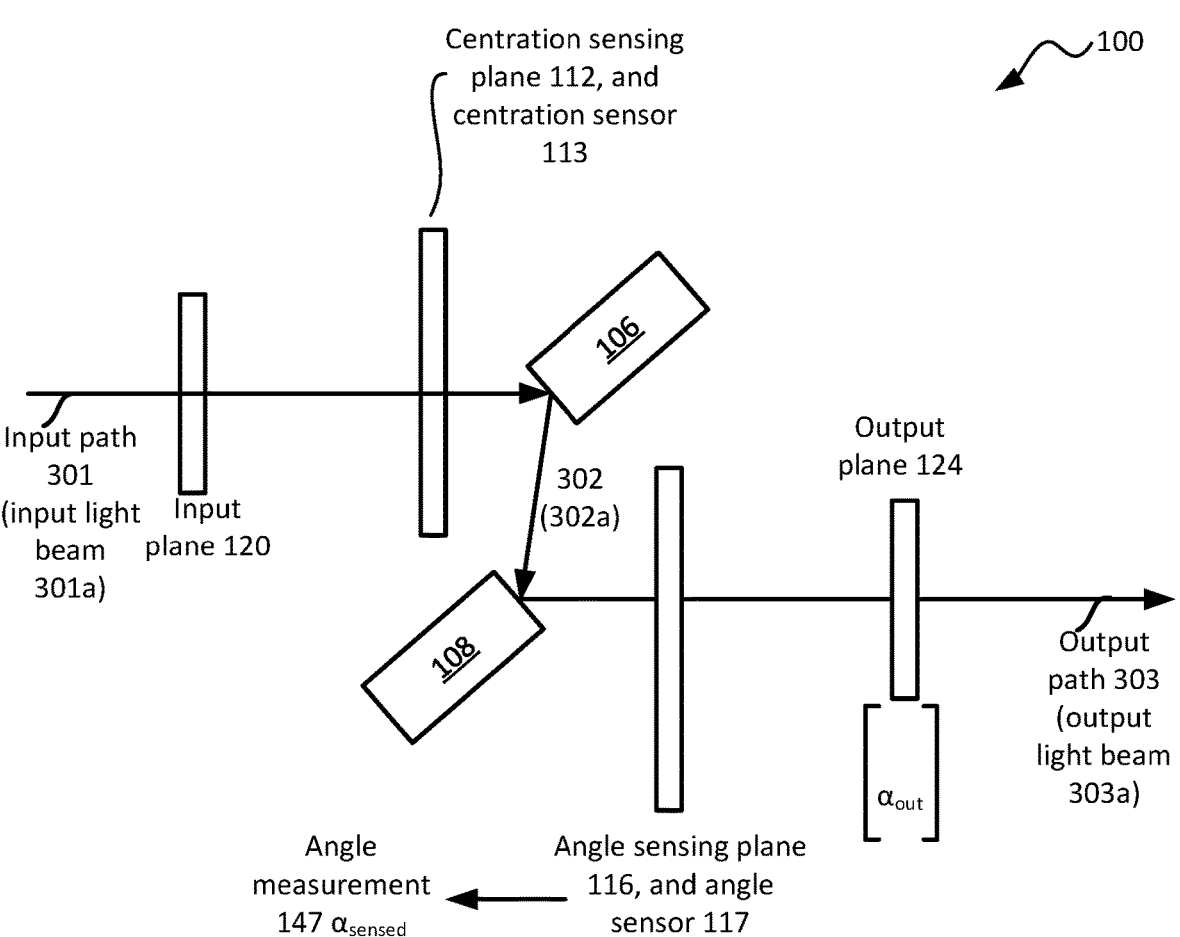
Figure 3C:
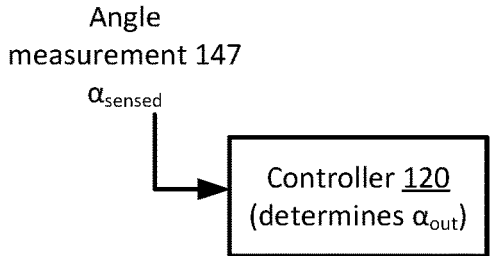
Figure 3D:
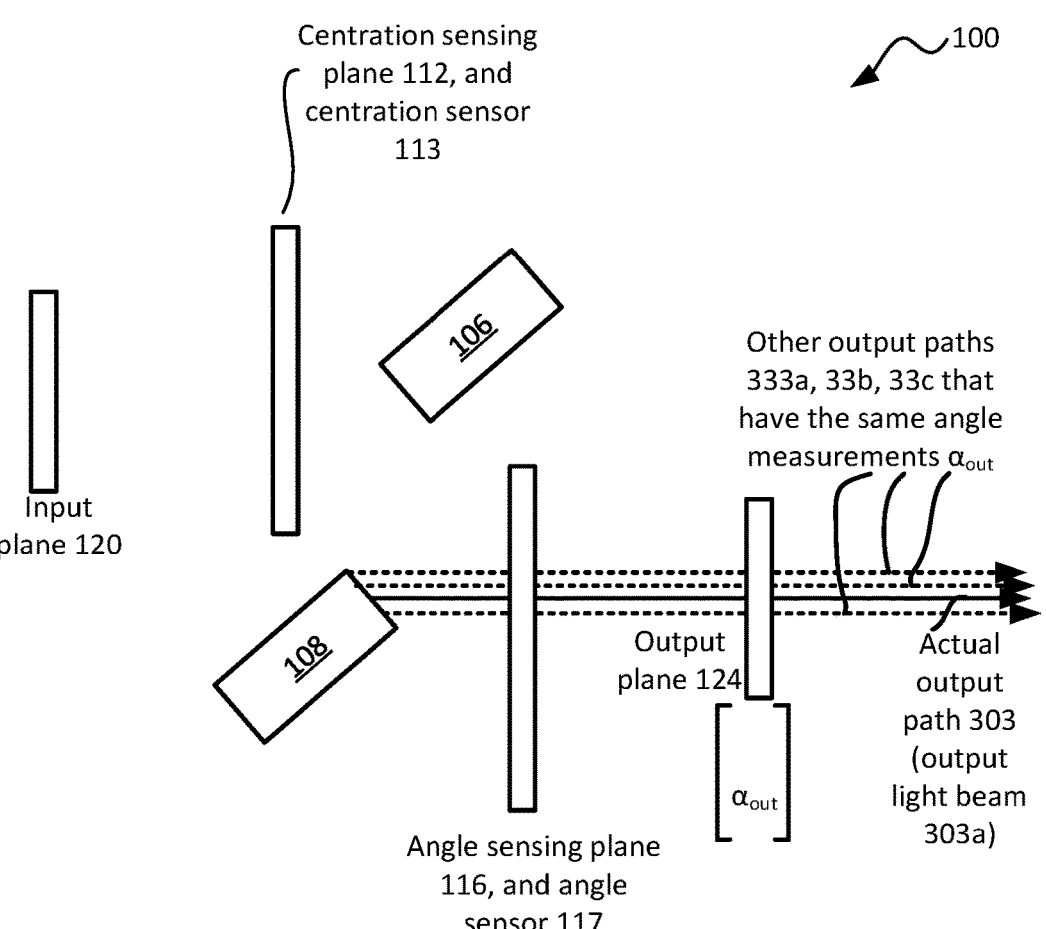
Figure 3D:
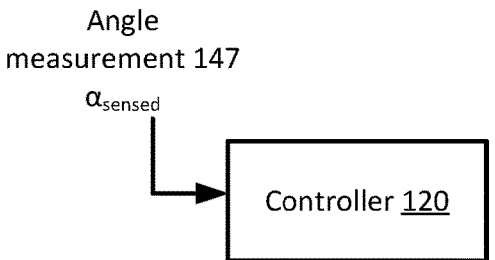
Figure 3E:
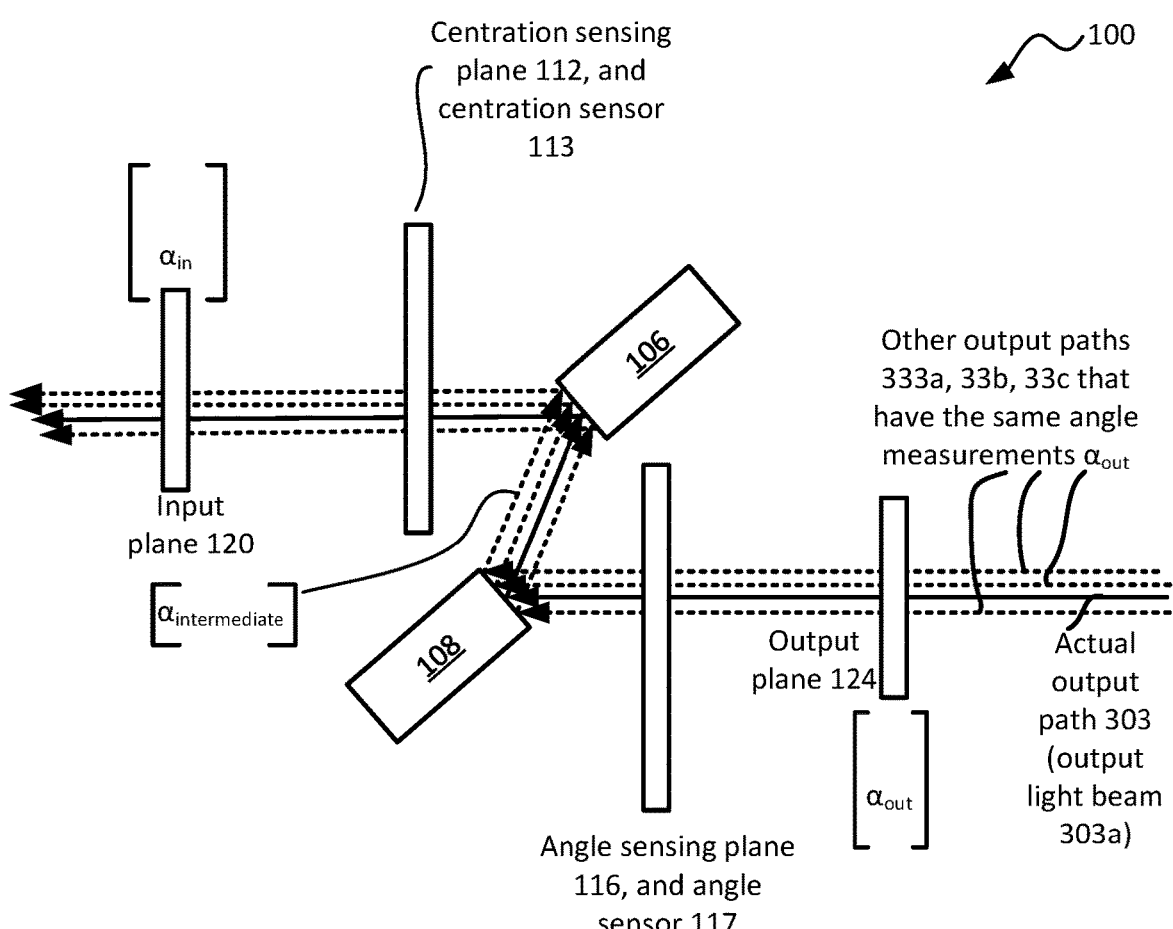
Figure 3E:
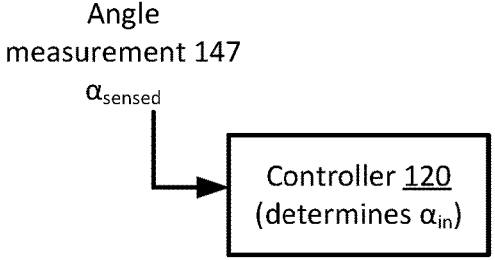
Figure 3F:
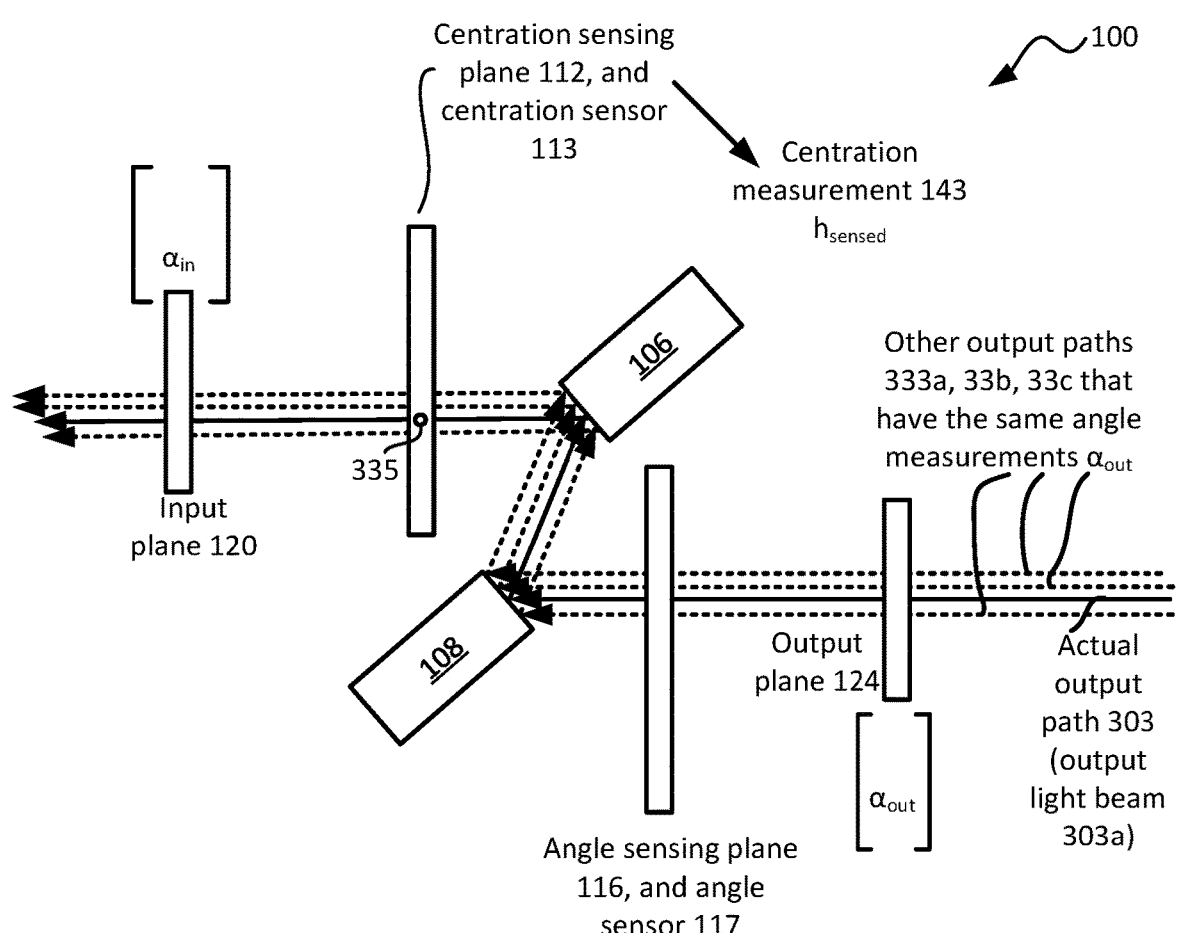
Figure 3F:
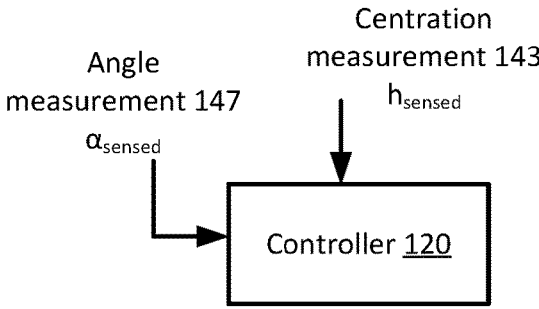
Figure 3G:
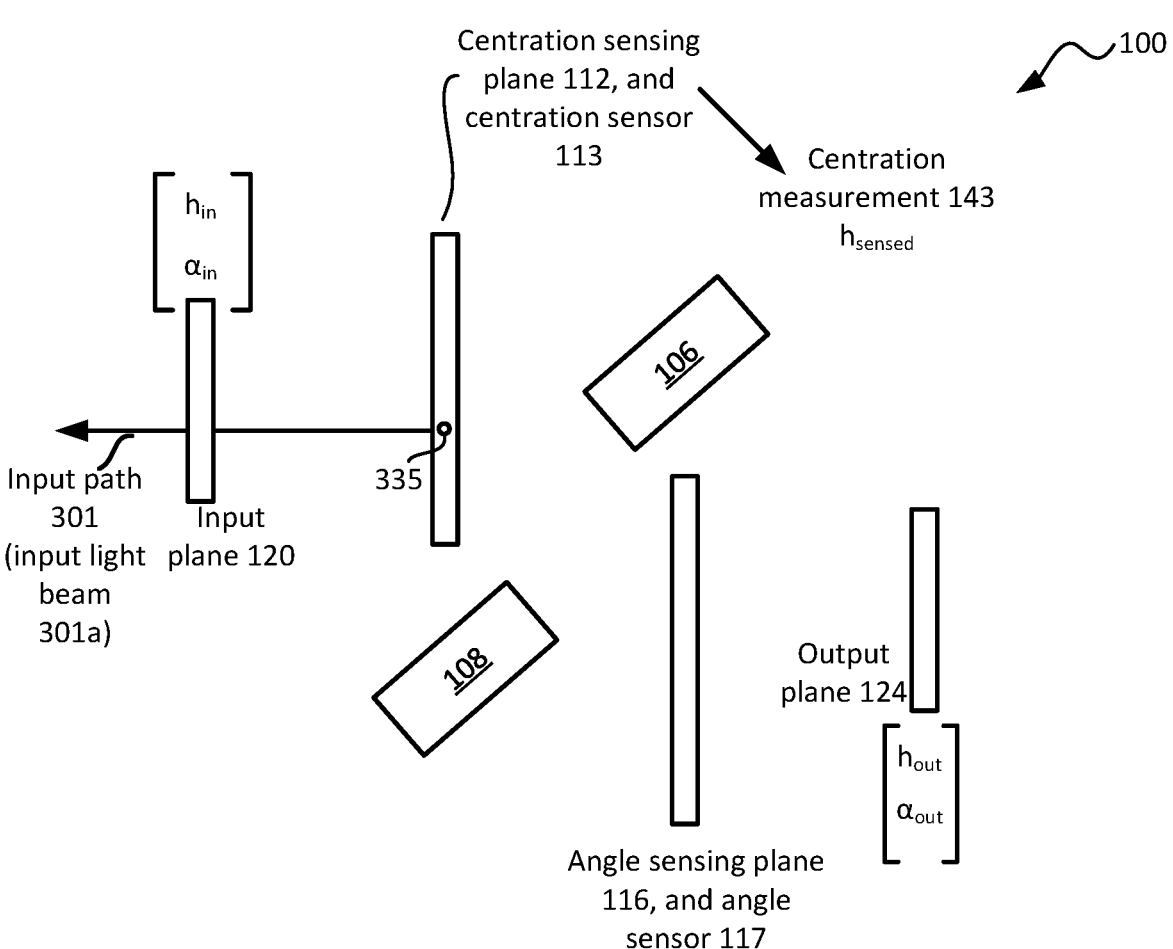
Figure 3G:
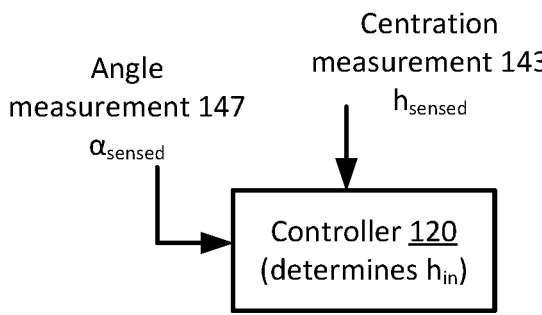
Figure 3I:
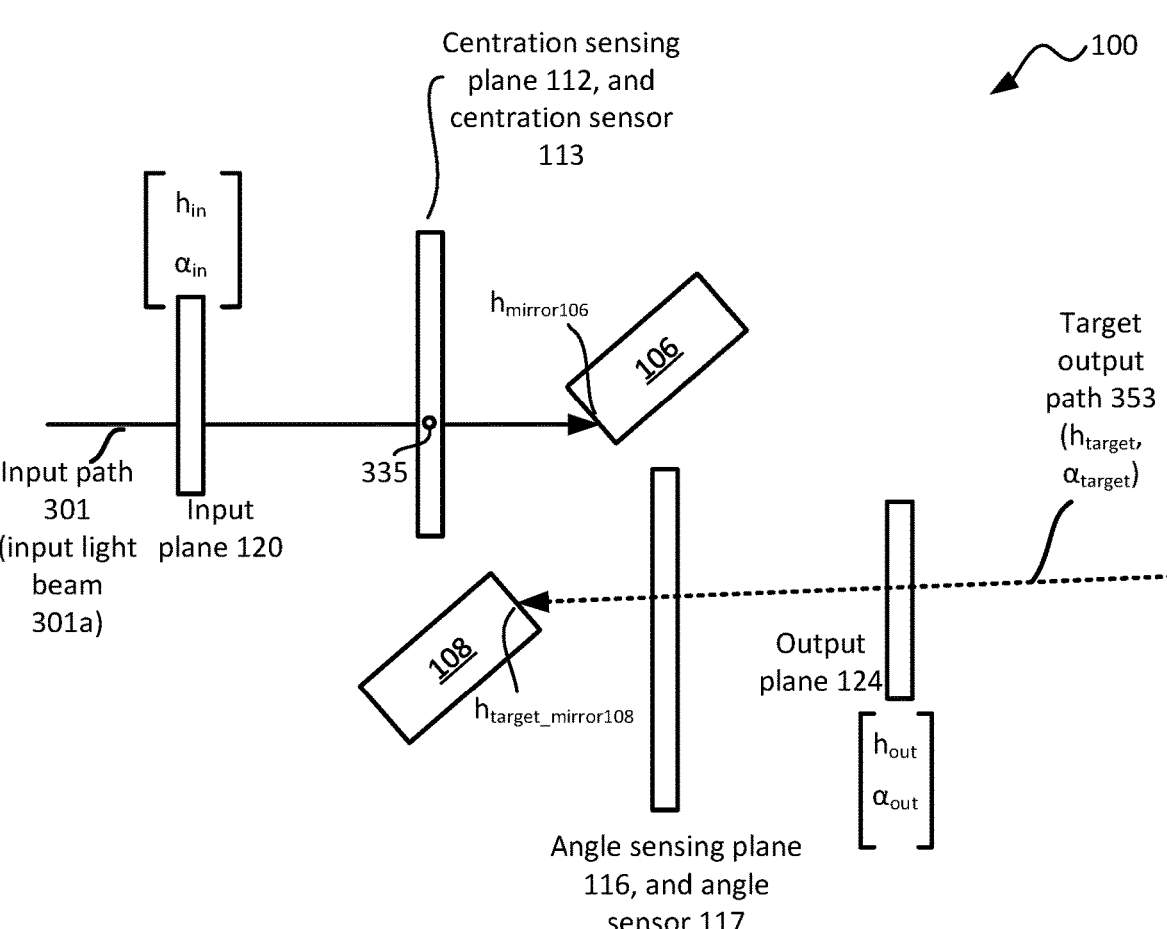
Figure 3I:
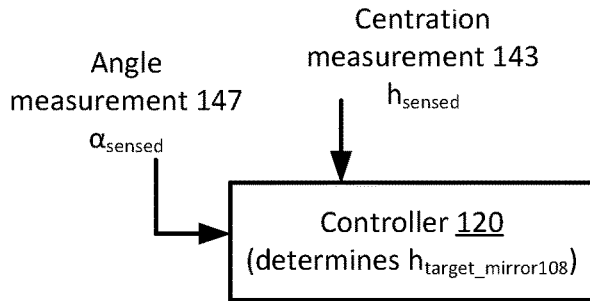

The controller then determines a position of the input light beam at the first mirror (e.g., see FIG. 3H), and a target output position of the target output light beam at the second mirror (e.g., see FIG. 3I). The controller subsequently determines a target intermediate path between the position on the first mirror and the position on the second mirror (e.g., see FIG. 3J). Subsequently, the controller determines a target orientation of the first mirror, based on the input path and the target intermediate path (e.g., see FIG. 3K). Also, the controller determines a target orientation of the second mirror, based on the target intermediate path and the target output path (e.g., see FIG. 3L). The controller issues a first control signal to the first mirror, to achieve the target orientation of the first mirror, and issues a second control signal to the second mirror, to achieve the target orientation of the second mirror. Servos or other mirror adjustment circuits operatively coupled to the first and second mirrors receive the first and second control signals, so as to move at least a portion of the reflecting surfaces of the first and second mirrors, respectively. Once the mirrors are controlled in accordance with the first and second control signals, the input light beam along the input path is reflected by the first mirror along the target intermediate path, and which is further reflected by the second mirror along the target output path (e.g., see FIG. 3M).

Architecture

FIG. 1 illustrates an example folded optical system 100, in accordance with an embodiment of the present disclosure. As shown, this example system includes a first mirror 106 and a second mirror 108, a centration sensor 113 on an input path of the first mirror 106, an angle sensor 117 on an output path of the second mirror 117, and a controller 120. This example further illustrates nominal light paths and nominal positions of the first and second mirrors 106, 107.

Any appropriate type of mirrors may be used for mirrors 106 and 108, such as mirrors whose position and orientation can be electrically controlled or steered. In an example, the mirrors 106 and/or 108 are fast steering mirrors (FSM). In an example, each of the mirrors 106 and/or 108 and associated adjustment circuitry may provide rotation of the reflecting surface(s) of the mirrors 106 and/or 108 along one or more axes, such as along two axes.

As illustrated in FIG. 1, the two mirrors 106, 108, in combination, propagate the light beam roughly in a "Z" shaped path, and hence, the optical system 100 is also referred to as a Z-fold optical system. Other embodiments may have a differently shaped folded path (e.g., "S" shaped path) that may also benefit from the techniques described herein.

In one embodiment, the system 100 comprises a controller 120 generating mirror control signals 186 and 188 to respectively control steering of the mirrors 106 and 108. For example, when the mirror 106 receives the mirror control signal 186, an adjustment circuit of the mirror 106 (e.g., one or more servo motors or other steering components) steers the mirror 106 in accordance with the mirror control signal 186. Similarly, when the mirror 108 receives the mirror control signal 188, a movement or adjustment circuit of the mirror 108 (e.g., one or more servo motors or other steering components) steers the mirror 108 in accordance with the mirror control signal 188. The mirror control signals 186, 188 will be described below in further detail.

Path of a light beam incident on the mirror 106 is referred to as an input path, path of a light beam between the mirrors 106 and 108 is referred to as intermediate path, and path of a light beam reflected by the mirror 108 is referred to as output path. A section of the system 100 including the input path is also referred to as an input side of the system 100. Another section of the system 100 including the output path is also referred to as an output side of the system 100.

In the example of FIG. 1, illustrated is a nominal path of a light beam 104, where the nominal path of the light beam 104 comprises a nominal input path 101, a nominal intermediate path 102, and a nominal output path 103 of the light beam 104. For example, the mirror 106 reflects the light beam 104 from the nominal input path 101 to the nominal intermediate path 102, and the mirror 108 reflects the light beam 104 from the nominal intermediate path 102 to the nominal output path 103. The corresponding positions of the mirrors 106 and 108 are referred to herein as nominal positions 107 and 108, respectively, of the mirrors 106 and 108.

One or more measurements of the system 100 are taken relative to the nominal paths 101, 102, 103 of the light beam 104 and/or the nominal positions 107, 108 of the mirrors 106 and 108. Note that no actual light beam may traverse through the system 100 in FIG. 1 along the nominal paths 101, 102, 103—rather, the controller 120, the centration sensor 113, and the angle sensor 117 perform various measurements relative to, or with respect to, the nominal paths 101, 102, 103 of the light beam 104 and/or the nominal positions 107, 108 of the mirrors 106, 108, respectively. The light beam 104 is also referred to as a nominal light beam 104, as it follows the nominal path 101, 102, 103. The nominal light beam 104 is illustrated using bold and dashed line in FIG. 1, e.g., to better differentiate the nominal light beam 104 from one or more other light beams described below.

In one embodiment, an imaginary input plane 120 is defined with respect to the nominal positions 107 and 108 of the mirrors 106, 108, respectively, where the input plane 120 is in the input side of the system 100. Thus, in an example, one or more light beams incident on the mirror 106 traverse through the input plane 120. In an example, the input plane 120 is an imaginary two-dimensional plane angled at pre-specified angles relative to the nominal input path 101, and the nominal positions 107 and 108 of the mirrors 106, 108, respectively.

In one embodiment, an imaginary output plane 124 is defined with respect to the nominal positions 107 and 108 of the mirrors 106, 108, respectively, where the output plane 124 is in the output side of the system 100. Thus, in an example, one or more light beams reflected from the mirror 108 traverses through the output plane 124. In an example, the output plane 124 is an imaginary two-dimensional plane angled at pre-specified angles relative to the nominal output path 103, and the nominal positions 107 and 108 of the mirrors 106, 108, respectively.

In one embodiment, the system 100 comprises a centration sensor 113 measuring a centration $h_{sensed}$ of input light beams incident on the mirror 106. The centration sensor 113 measures the centration $h_{sensed}$ of the light beam relative to an imaginary centration sensing plane 112. The centration sensor 113 and the centration sensing plane 112 are, in combination, illustrated as a solid rectangular box in various figures, without illustrating detail of the centration sensor 113. Any appropriate centration sensor 113 may be used. Note that the centration sensor 113 is in the input side of the system 100, and hence, measures centration of light beams incident on the mirror 106. Note that although the centration sensing plane 112 is illustrated to be on the input path of the first mirror 106 in the example of FIG. 1, the centration sensing plane 112 may be located elsewhere in the optical system 100 as well, such as located on an intermediate path or an output path, as described below. Also, note that the centration sensor 113 may be proximal to, or distal to the centration sensing plane 112. For example, the centration sensor 113 may be located anywhere, and be sensing a location of the beam at the centration sensing plane 112.

Also, specifically in FIG. 1, the light beam 104 is the nominal light beam, and the input path is a nominal input path 101. Accordingly, the centration measurement performed in FIG. 1 is a nominal centration measurement.

As described above, the centration measurement is relative to the centration sensing plane 112. The controller 120 can translate the centration measurement $h_{sensed}$ with respect to the centration sensing plane 112 to centration measurement $h_{in}$ with respect to the input plane 120 (e.g., provided the controller 120 has access to angle measurement data as well), as will be described in further detail below.

The centration measurement $h_{in}$ with respect to the input plane 120 in FIG. 1 is the nominal centration measurement $h_{in\_nominal}$. In an example, the nominal centration measurement $h_{in\_nominal}$ is assumed to be zero. Any other centration measurement of any other light beam is done relative to this nominal centration measurement $h_{in\_nominal}$. For example, the nominal centration measurement $h_{in\_nominal}$ is a point on the two-dimensional input plane that uniquely defines a nominal position within the input plane 120. In an example, the nominal centration measurement $h_{in\_nominal}$ is assumed to be a zero centration position. Another centration measurement of another light beam is relative to this nominal or zero position within the input plane 120, e.g., how far or decentered is the other light beam on the input plane relative to this nominal zero position within the input plane 120.

In an example and as illustrated in FIG. 1, the input plane 120 and the centration sensing plane 112 are different from each other. In the example of FIG. 1, the input plane 120 and the centration sensing plane 112 are illustrated to be parallel, and these two planes may be parallel to each other, although in another example they may not be parallel to each other. In yet another example, the input plane 120 and the centration sensing plane 112 may at least in part overlap with each other. In an example, the controller 120 is aware of an orientation of the input plane 120 relative to the centration sensing plane 112. Furthermore, although the centration sensing plane 112 is illustrated to be on the input path of the first mirror 106 in the example of FIG. 1, the centration sensing plane 112 may be located elsewhere in the optical system 100 as well, such as located on an intermediate path or an output path. Thus, in an example, the optical system 100 and the determinations described herein are agnostic to an actual location of the centration sensing plane 112.

In one embodiment, the system 100 comprises an angle sensor 117 measuring an angle of output light beams reflected by the mirror 108. The angle sensor 117 measures the angle $\alpha_{sensed}$ of the light beam relative to an imaginary angle sensing plane 116. The angle sensor 117 and the angle sensing plane 116 are, in combination, illustrated as a solid rectangular box, without illustrating detail of the angle sensor 117. Any appropriate angle sensor 117 may be used. Note that the angle sensor 117 is in the output path, and hence, measures angle of light beams reflected by the mirror 108 on the output side of the system 100.

Also, specifically in FIG. 1, the light beam 104 is the nominal light beam, and the output path is a nominal output path 101. Accordingly, the angle measurement performed in FIG. 1 is a nominal angle measurement.

Also, note that the angle measurement is relative to the angle sensing plane 116. The controller 120 can translate the angle measurement $\alpha_{sensed}$ with respect to the angle sensing plane 116 to angle measurement $\alpha_{out}$ with respect to the output plane 124. For example, if the output plane 124 and the angle sensing plane 116 are parallel, then an angle with which the light beam reaches the angle sensing plane 116 would be same the angle with which the light beam reaches the output plane 124. In contrast, if the output plane 124 and the angle sensing plane 116 are not parallel, then the controller 120 can translate, from the angle with which the light beam reaches the angle sensing plane 116, to an angle with which the light beam reaches the output plane 124 (e.g., based on known orientation of the output plane 124 with respect to the angle sensing plane 116, and a distance between the two planes), in an example.

The angle measurement $\alpha_{out}$ with respect to the output plane 124 in FIG. 1 is the nominal angle measurement $\alpha_{out\_nominal}$. In an example, the nominal angle measurement $\alpha_{out\_nominal}$ is assumed to be zero. Any other angle measurement of any other light beam is done relative to this nominal angle measurement $\alpha_{out\_nominal}$. For example, the nominal angle measurement $\alpha_{out\_nominal}$ uniquely defines a nominal angle of incident of light on the output plane 124, and may assume a zero value of the nominal angle measurement $\alpha_{out\_nominal}$. Another angle measurement of another light beam is relative to this nominal angle within the output plane 124.

In an example and as illustrated in FIG. 1, the output plane 124 and the angle sensing plane 116 are different from each other. In the example of FIG. 1, the output plane 124 and the angle sensing plane 116 are illustrated to be parallel, and these two planes may be parallel to each other, although in another example they may not be parallel to each other. In yet another example, the output plane 124 and the angle sensing plane 116 may at least in part overlap with each other.

In an example and as will be describe below in further detail, in general, from (i) the centration measurements by the centration sensor 113 at the input path and (ii) the angle measurements by the angle sensor 117 at the output path of the system 100, the following parameters can be derived: $h_{in}$, $\alpha_{in}$, $h_{out}$, and $\alpha_{out}$, which are the centration and angle measurements of the input light with respect to the input plane 120, and the centration and angle measurements of the output light with respect to the output plane 124, respectively. For FIG. 1, all these measurements represent nominal measurements, such as $h_{in\_nominal}$, $\alpha_{in\_nominal}$, $h_{out\_nominal}$, and $\alpha_{out\_nominal}$, as described above.

In one embodiment, the controller 120 comprises one or more appropriate processors and one or more nontangible storage medium, such as a memory, storing instructions. The instructions, when executed by the processors, perform one or more operations of the controller 120 described herein. In an example, the one or more processors may include any suitable processor, and may include one or more coprocessors or controllers, such as an audio processor or a graphics processing unit, to assist in processing operations of the controller 120. Likewise, the memory can be implemented using any suitable type of digital storage, such as one or more of a disk drive, solid state drive, a universal serial bus (USB) drive, flash memory, random access memory (RAM), or any suitable combination of the foregoing.

Figure 2:
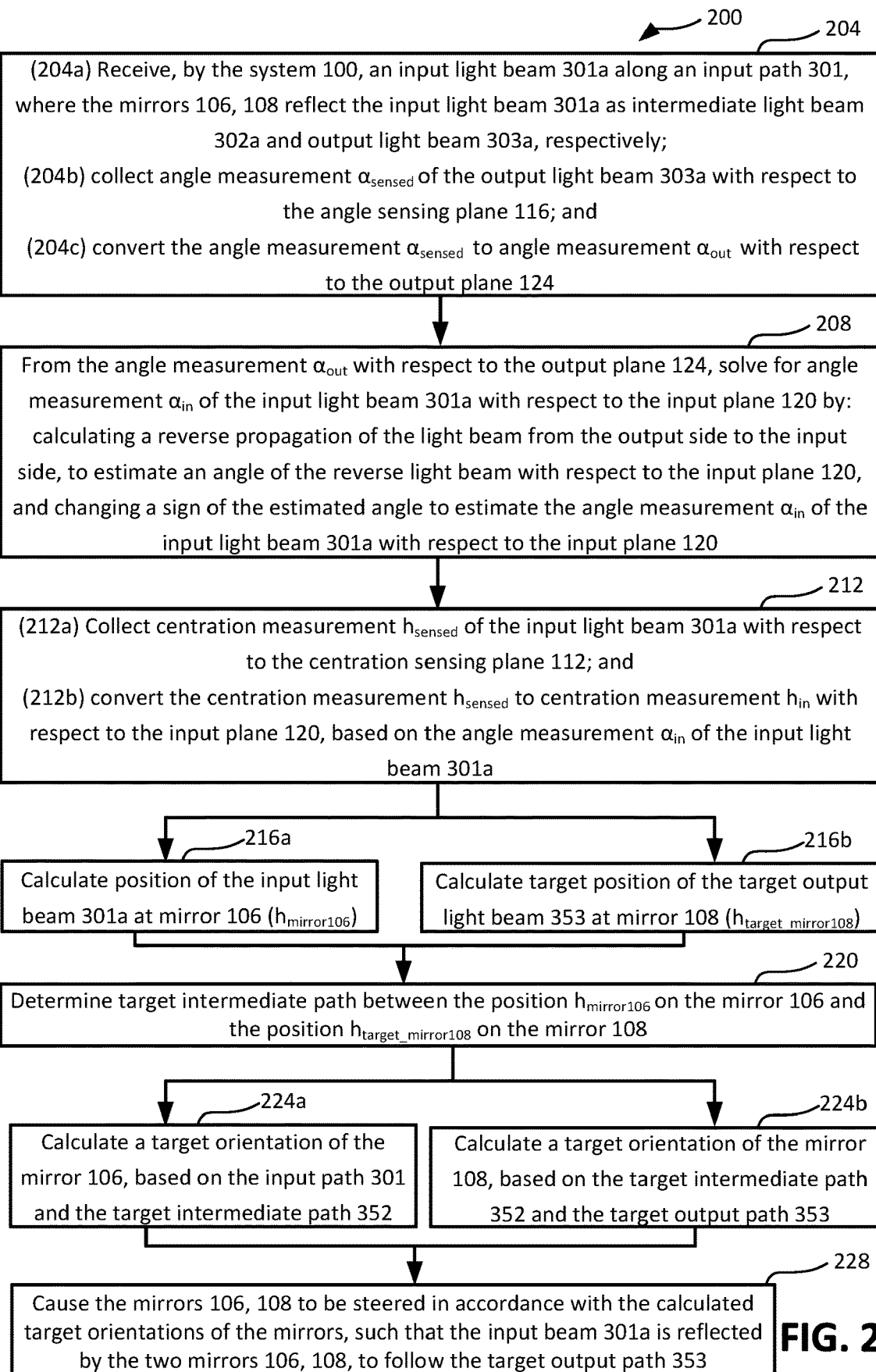
FIG. 2 illustrate a flowchart depicting a method of operating the optical system of FIG. 1, such that an input light beam is output by the optical system along a target output path, in accordance with an embodiment of the present disclosure.

FIG. 2 illustrate a flowchart depicting a method 200 of operating the first mirror 106 and the second mirror 108 of the system 100 of FIG. 1, such that an input light beam 301a is output by the system 100 along a target output path 353, in accordance with an embodiment of the present disclosure. FIGS. 3A, 3B, 3C, 3D, 3E, 3F, 3G, 3H, 3I, 3J, 3K, 3L, and 3M collectively illustrate the system 100 and describe various processes of the method 200 of FIG. 2, in accordance with an embodiment of the present disclosure. FIGS. 2 and 3A-3G will be discussed in unison.

The method 200 of FIG. 2 includes a process 204, which includes three subprocesses 204a, 204b, 204c. At subprocess 204a, an input light beam 301a is received by the system 100 along an input path 301, as illustrated in FIG. 3A. The mirrors 106, 108 reflect the input light beam 301a as intermediate light beam 302a and output light beam 303a, respectively, as also illustrated in FIG. 3A. For example, the mirror 106 reflects the input light beam 301a as an intermediate light beam 302a along an intermediate path 302, and the mirror 108 reflects the intermediate light beam 302a as an output light beam 303a along an output path 303.

At this point in the method 200, no centration and angle measurements have been taken, and the input, intermediate, and output paths are unknown to the controller 120. Accordingly, FIG. 3A doesn't illustrate the sensors 113, 117 outputting any measurements.

Note that the orientations of the mirrors 106, 108 in FIG. 3A, with respect to the nominal positions 107, 109 of the mirrors 106, 108, respectively (see FIG. 1), are known to the controller 120. In FIG. 2, the mirrors 106, 108 may be at their nominal positions 107, 109, respectively, or may be positioned differently, as long as their positions and/or orientations are known to the controller 120.

FIG. 3A also illustrates a target output path 353 using a dotted line. The target path 353 is defined using corresponding centration and angle measurements $h_{target}$, $\alpha_{target}$ with respect to the output plane 124.

The goal of the system 100 is to output the input light beam 301a along the target path 353, e.g., by appropriately steering the mirrors 106 and/or 108. It is assumed that the system 100 does not have control of the input light beam 301a or the input light path 301. Thus, the system 100 is configured to achieve the target output path 353, given the input light path 301, by appropriately steering the mirrors 106 and/or 108.

The process 304 proceeds from subprocess 304a to subprocess 304b. At subprocess 304b, the angle sensor 117 outputs angle measurement $\alpha_{sensed}$ of the output light beam 303a with respect to the angle sensing plane 116, which is received by the controller 120, as illustrated in FIG. 3B.

The process 304 proceeds from subprocess 304b to subprocess 304c. At subprocess 304c, the controller 120 converts the angle measurement $\alpha_{sensed}$ (which was with respect to the angle sensing plane 116) to angle measurement $\alpha_{out}$ with respect to the output plane 124, as illustrated in FIG. 3C. Such conversion of angle measurements has been described above with respect to FIG. 1. Thus, at this point in the method 200, the output angle measurement $\alpha_{out}$ with respect to the output plane 124 is known to the controller, as illustrated in FIG. 3C.

Note that at this point in the method 200, the controller 120 is merely aware of the angle measurement $\alpha_{out}$ of the output light beam 303a with respect to the output plane 124. There are several parallel light beams, such as output light beams 303a, 333a, 333b, 333c, 333d illustrated in FIG. 3D, which has the same angle measurement $\alpha_{out}$. Thus, the output path has not yet been uniquely determined by the controller 120. To uniquely determine the output path, centration measurements are also needed, in addition to the angle measurements. The actual output path 303 of the output light beam 303a is illustrated using a solid line, and other possible output paths 333a, 333b, 333c are illustrated using dotted line in FIG. 3D.

The method 200 proceeds from 204 to 208. At 208, the controller 120 solves, from the angle measurement $\alpha_{out}$ with respect to the output plane 124, for angle measurement $\alpha_{in}$ of the input light beam 301a with respect to the input plane 120. Thus, the controller 120, at process 208, determines the angle measurement $\alpha_{in}$ of the input light beam 301a with respect to the input plane 120.

In one embodiment, to solve for the angle measurement $\alpha_{in}$ of the input light beam 301a with respect to the input plane 120, the controller 120 determines a reverse propagation of the light beam from the output side to the input side (e.g., as if the light beam propagates in a reverse direction from the output to the input), to determine an angle of the reverse light beam with respect to the input plane 120, and changes a sign of the determined angle to determine the angle measurement $\alpha_{in}$ of the input light beam 301a with respect to the input plane 120, as illustrated in FIG. 3E.

For example, in FIG. 3E, as described above with respect to 3D, the controller 120 is aware of the angle measurement $\alpha_{out}$ of the output light beam 303a with respect to the output plane 124. Accordingly, there may be several parallel light beams, such as output light beams 303a, 333a, 333b, 333c, 333d illustrated in FIGS. 3D and 3E, each of which has the same angle measurement $\alpha_{out}$. Thus, when the light beams are reverse propagated, this generates a plurality of input light beams in the reverse direction (as if reflected by the mirrors 108 and 106). The angle of these beams with respect to the input plane 120 provides the angle measurement $\alpha_{in}$ of the input light beam 301a with respect to the input plane 120 (but with an opposite polarity, as the direction of the input light beam is reversed in FIG. 3E). Accordingly, at process 208, the sign of the angle measurement is reversed, to determine the angle measurement $\alpha_{in}$ of the input light beam 301$a$ with respect to the input plane 120.

Note that in process 208, the controller 120 doesn't actually reverse a direction of the light beam. Rather, the controller 120 does the determination by backtracking the light beam from the output to the input. For example, if $\alpha_{out}$ of the output light beam 303$a$ is known and the orientation of the mirror 108 are known, the controller 120 can determine an angle of the intermediate light beam $\alpha_{intermediate}$ (see FIG. 3E, where $\alpha_{intermediate}$ is labelled). Furthermore, if the angle of the intermediate light beam and the orientation of the mirror 106 are known, the controller 120 can determine an angle of the input light beam. Thus, by backtracking the light beam from the output to the input, the controller 120 determines the angle measurement $\alpha_{in}$ of the input light beam 301$a$ with respect to the input plane 120 at process 208.

The method 200 proceeds from 208 to 212. At 212, the controller 120 receives centration measurement $h_{sensed}$ of the input light beam 301$a$ with respect to the centration sensing plane 112, and the controller 120 converts the centration measurement $h_{sensed}$ to centration measurement $h_{in}$ with respect to the input plane 120.

For example, as illustrated in FIG. 3F, prior to the process 212, the controller 212 is aware of the angle measurement $\alpha_{in}$ of the input light beam, and is unaware of the centration $h_{in}$, and hence, multiple light beams can have the same angle $\alpha_{in}$. At process 212, the controller 212 receives the centration information $h_{sensed}$ from the centration sensor 113. Assume that the centration sensor 113 indicates a point 335 (see FIG. 3F) on the centration sensing plane 112, through which the input light beam passes. So, based on the previously determined angle measurement $\alpha_{in}$ and the currently received centration information $h_{sensed}$ from the centration sensor 113, the controller 120 can now uniquely determine the input path 301 of the input light beam 301$a$, as illustrated in FIG. 3G. For example, the controller 120 converts the centration measurement $h_{sensed}$ with respect to the centration sensing plane 112 to centration measurement $h_{in}$ with respect to the input plane 120. In an example, the controller 120 reverse propagates the input light beam from the point 335 of centration measurement $h_{sensed}$ on the centration sensing plane 112 to the input plane 120 (taking into account the angle measurement $\alpha_{in}$), to determine the centration measurement $h_{in}$ of the input light beam 301$a$ with respect to the input plane 120, as illustrated in FIG. 3G. In an example, the angle measurement an and centration measurement $h_{in}$ of the input path 301 uniquely defines the input path 301 of the input light beam 301$a$. Note that although the centration sensing plane 112 is illustrated to be on the input path of the first mirror 106 in the example of FIG. 1, the centration sensing plane 112 may be located elsewhere in the optical system 100 as well, such as located on the intermediate path or the output path. If the centration sensing plane 112 is, for example, located on the intermediate path, process 212$b$ is appropriately modified to determine the centration measurement $h_{in}$ with respect to the input plane 120. In such an example, the controller 120 reverse propagates the light beam from the centration sensing plane 112 in the intermediate path (e.g., reverse propagates from the $h_{sensed}$ in the intermediate path) with angle measurement $\alpha_{intermediate}$ (see FIG. 3E) off the mirror 106 to the input plane, to determine the centration measurement $h_{in}$ of the input light beam 301$a$ with respect to the input plane 120.

In an example, now that the angle measurement $\alpha_{in}$ and centration measurement $h_{in}$ of the input path 301 have been determined, the controller 120 may also optionally determine the centration measurement $h_{out}$ of the output path 301 with respect to the output plane 124 (e.g., based on the orientations of the mirrors 106 and 108). For example, the controller 120 determines reflection of the input path 301 by the mirror 106, and again by the mirror 108, to determine the centration measurement $h_{out}r$ of the output path 301 with respect to the output plane 124. Note that the angle measurement $\alpha_{out}$ of the output path was determined previously. In another example, the determination of the centration measurement $h_{out}r$ of the output path 301 may be optional, and may not be determined by the controller 120.

The method 200 proceeds from 212 to processes 216$a$ and 216$b$. In an example, processes 216$a$ and 216$b$ may be performed in parallel, or at least in part sequentially, and/or in any order (process 216$a$ followed by process 216$b$, or vice versa). In an example, processes 216$a$ and 216$b$ can be performed independent of each other.

At process 216$a$, controller 120 determines position of the input light beam 301$a$ at mirror 106, which is $h_{mirror106}$, as illustrated in FIG. 3H. For example, the controller 120 knows $h_{in}$ and $\alpha_{in}$ that uniquely defines the input path 301, and based on these parameters, determines propagation of the input light beam 301$a$ along the input path 301 to the mirror 106, to determine a position $h_{mirror106}$ on the mirror 106 where the input light beam 301$a$ hits.

At process 216$b$, controller 120 determines a target position of the target output light beam 353 at mirror 108, which is referred to as $h_{target\_mirror108}$, as illustrated in FIG. 3I. For example, the controller 120 knows $h_{target}$ and $\alpha_{target}$, which uniquely defines the target output path 353. Based on these parameters, the controller 120 determines reverse propagation of the target light beam to the mirror 108, to determine the target position $h_{target\_mirror108}$ on the mirror 108 from where the target output light beam has to be reflected towards the output side.

Note that as described above, the input light beam 301$a$ cannot be controlled by the controller 120, and the input light beam 301$a$ will hit the position $h_{mirror106}$ of the mirror 106. Similarly, as also described above, the target output path 353 is prespecified as a target, and for the target output light beam to follow the target output path 353, the target output light beam has to be reflected from the position $h_{target\_mirror108}$ on the mirror 108. Accordingly, the target light beam has to propagate through the position $h_{mirror106}$ on the mirror 106 and the position $h_{target\_mirror108}$ on the mirror 108.

The method 200 proceeds from processes 216$a$, 216$b$ to process 220. At 220, the controller 120 determines a target intermediate path 352 between the position $h_{mirror106}$ on the mirror 106 and the position $h_{target\_mirror108}$ on the mirror 108, as illustrated in FIG. 3J. Thus, given the input light beam 301$a$ along the input path 301 (which cannot be changed by the controller 120), the light beam has to take the target intermediate path 352 between the position $h_{mirror106}$ on the mirror 106 and the position $h_{target\_mirror108}$ on the mirror 108, to the target output path 353. Because the position $h_{mirror106}$ on the mirror 106 and the position $h_{target\_mirror108}$ on the mirror 108 were determined earlier with respect to processes 216$a$, 216$b$, respectively, determining the target intermediate path 352 merely involves connecting the positions $h_{mirror106}$ and $h_{target\_mirror108}$, as illustrated in FIG. 3J.

The method 200 proceeds from 220 to processes 224$a$ and 224$b$. In an example, processes 224$a$ and 224$b$ may be performed in parallel, or at least in part sequentially, and/or in any order (process 224$a$ followed by process 224$b$, or vice versa). In an example, processes 224a and 224b can be performed independent of each other.

At process 224a, the controller 120 determines a target orientation of the mirror 106, based on the input path 301 and the target intermediate path 352, as illustrated in FIG. 3K. For example, as described above, prior to process 224, the controller 120 is aware of the input path 301 and the target intermediate path 352. The controller 120 is configured to determine the target orientation of the mirror 106 (e.g., target orientation of at least a portion of the reflecting surface of the mirror 106 that includes the position $h_{mirror106}$), such that the input light beam 301a along the input path 301 is reflected along the target intermediate path 352.

For example, the controller 120 determines the target orientation of the mirror 106, based at least in part on the input path 301 of the input light beam 301a and the target intermediate path 352, such that an imaginary line $N_{mirror}$ 106, which is normal or orthogonal to the reflecting surface of the mirror 106 at centration position $h_{mirror106}$, bisects an angle between the input path 301 and the target intermediate path 352, as illustrated in FIG. 3K. For example, the line $N_{mirror\ 106}$ has an angle θ1 with respect to the input path 301, and has an angle θ2 with respect to the target intermediate path 352. The line $N_{mirror\ 106}$ is adjusted such that the angles θ1 and θ2 are substantially the same (e.g., within an acceptable tolerance, such as within 4 or 5 degrees of each other, or less). Theoretically, due to the law of reflection, angles θ1 and θ2 are the same, although there may be some margin of negligible or otherwise acceptable error in practical implementation between the target intermediate path and the actual intermediate path, e.g., due to imprecision in controlling actual location of the various mirrors. In an example, if a unit vector V1 defines the input path 301 and another unit vector V2 defines the target intermediate path 352, then $N_{mirror\ 106}$=V2−V1. In an example, the vectors V1 and V2 are normalized, prior to determining $N_{mirror106}$. Once $N_{mirror}$ 106 is known, the target orientation of the mirror 106 is such that the reflecting surface of the mirror 106 at the centration position $h_{mirror106}$ is normal or orthogonal to $N_{mirror\ 106}$.

Figure 3L:
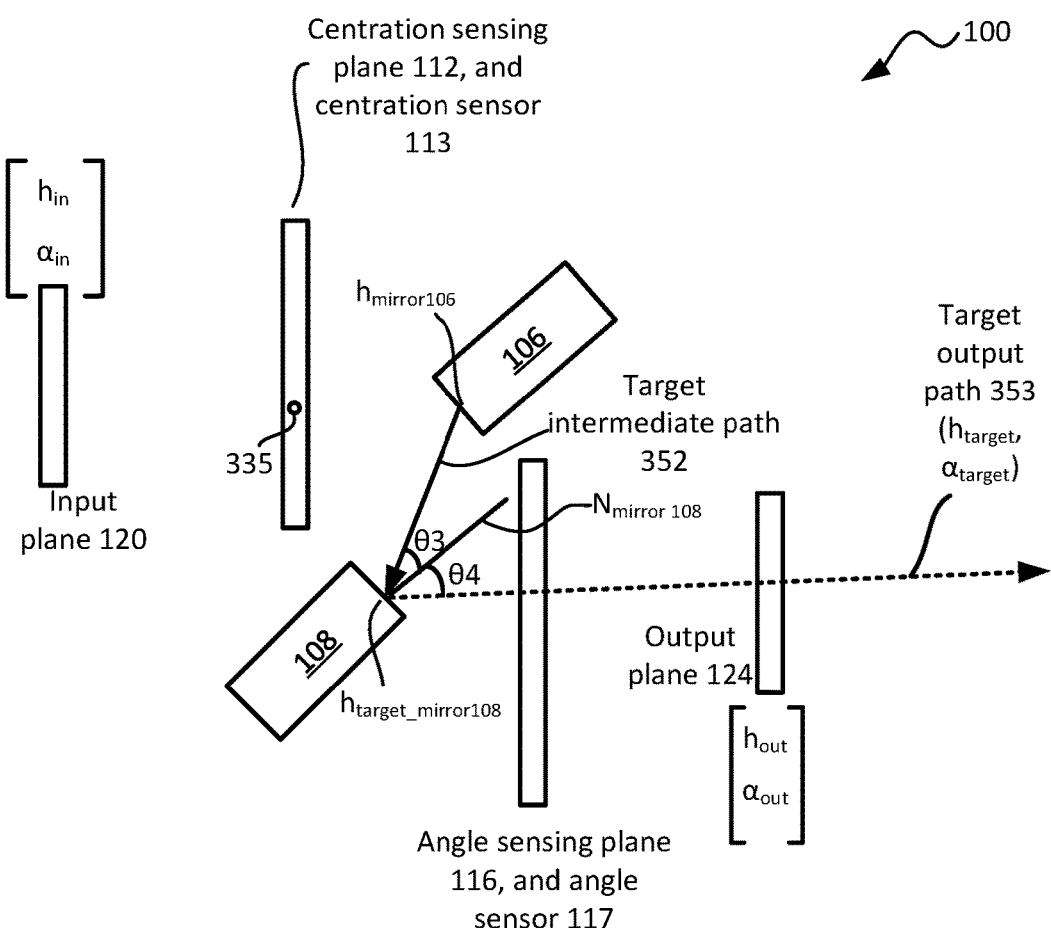
Figure 3L:
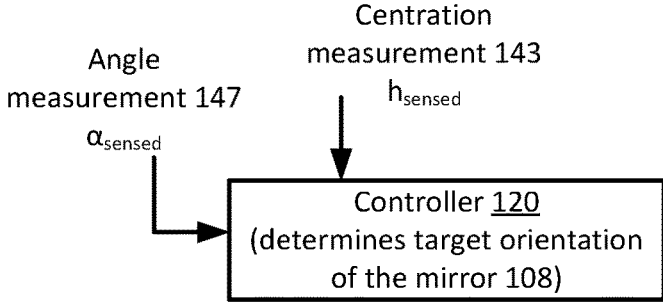

Similarly, at process 224b, the controller 120 calculates a target orientation of the mirror 108, based on the target intermediate path 352 and the target output path 353, as illustrated in FIG. 3L. For example, as described above, prior to process 224, the controller 120 is aware of the target intermediate path 352 and the target output path 353. The controller 120 is configured to determine the target orientation of the mirror 108 (e.g., target orientation of at least a portion of the reflecting surface of the mirror 108 that includes the position $h_{targetmirror108}$), such that an intermediate light beam along the target intermediate path 352 is reflected by the mirror 108 along the target output path 353.

For example, the controller 120 determines the target orientation of the mirror 108, based at least in part on the target intermediate path 352 and the target output path 353, such that an imaginary line $N_{mirror\ 109}$, which is normal or orthogonal to the reflecting surface of the mirror 108 at centration position $h_{mirror108}$, bisects an angle between the target intermediate path 352 and the target output path 353. For example, the line $N_{mirror\ 108}$ has an angle θ3 with respect to the target intermediate path 352, and has an angle θ4 with respect to the target output path 353. The line $N_{mirror\ 108}$ is adjusted such that the angles θ3 and θ4 are substantially the same (e.g., within 4 or 5 degrees of each other, or less). In an example, due to the law of reflection, angles θ3 and θ4 are exactly the same in the calculation. For example, if the unit vector V2 defines the target intermediate path 352 and another unit vector V3 defines the target output path 353, then $N_{mirror\ 108}$=V3−V2. In an example, the vectors V2 and V3 are normalized, prior to determining $N_{mirror108}$. Once $N_{mirror\ 108}$ is known, the target orientation of the mirror 108 is such that the reflecting surface of the mirror 108 at centration position $h_{mirror108}$ is normal or orthogonal to $N_{mirror\ 108}$.

Figure 3M:
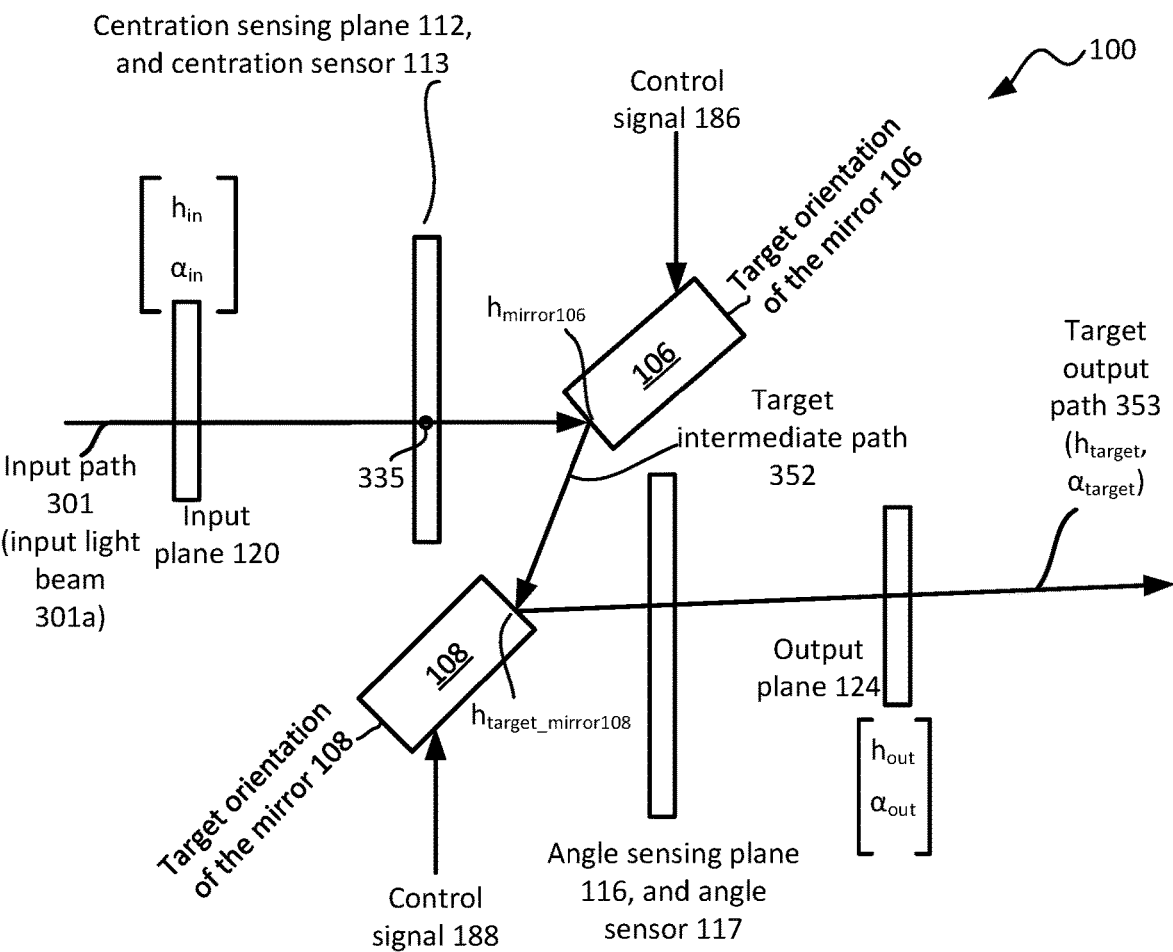
Figure 3M:
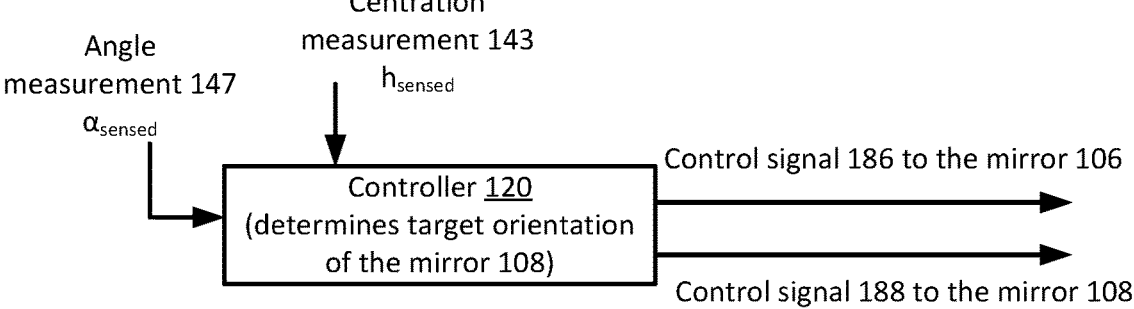

The method 200 proceeds from processes 224a, 224b to process 228. At 228, the controller 120 causes the mirrors 106, 108 to be steered in accordance with the calculated target orientations of the mirrors, such that the input beam 301a is reflected by the two mirrors 106, 108, to follow the target output path 353, as illustrated in FIG. 3M.

For example, the controller 120 issues a control signal 186 to the mirror 106, to achieve the target orientation of the mirror 106. An adjustment circuit within or otherwise operably coupled to the mirror 106 steers at least a portion of the reflecting surface of the mirror 106, which includes the position $h_{mirror106}$, in accordance with the corresponding target orientation.

Similarly, the controller 120 issues a control signal 188 to the mirror 108, to achieve the target orientation of the mirror 108. A motion or adjustment circuit within or otherwise operably coupled to the mirror 108 steers at least a portion of the reflecting surface of the mirror 108, which includes the position $h_{target\_mirror108}$, in accordance with the corresponding target orientation. Thus, the input light beam 301a along the input path 301 is reflected by the mirror 106 along the target intermediate path 352, and which is further reflected by the mirror 108 along the target output path 353, as illustrated in FIG. 3M.

Various determinations and processes described herein may have or otherwise introduce some margin of error (e.g., a deviation from more exacting theoretical results). For example, the light output by the mirror 108 may substantially follow the target output path 353 within an acceptable margin of error, rather than exactly follow the target output path 353. To this end, perfect or theoretical results are not required, and actual path determinations may include a degree of error that is negligible or otherwise acceptable to a given application.

Note that the processes in method 200 are shown in a particular order for ease of description, and according to one example. In other examples, one or more of the processes may be performed in a different order or may not be performed at all. Numerous variations on method 200 and the techniques described herein will be apparent in light of this disclosure.

Further Example Embodiments

The following examples pertain to further embodiments, from which numerous permutations and configurations will be apparent.

Example 1. An apparatus comprising: a first mirror configured to reflect an input light beam as an intermediate light beam; a second mirror configured to reflect the intermediate light beam as an output light beam; an angle sensor configured to measure an angle of the output light beam; a centration sensor configured to measure a centration of the input light beam, and a controller configured to determine, based at least in part on measurements from the centration sensor and the angle sensor, an input path of the input light beam, determine, based at least in part on the determined input path of the input light beam and a target output path, a target intermediate path, and determine, based at least in part on the target intermediate path, a target orientation of the first mirror and a target orientation of the second mirror, such that the first and second mirrors, when steered to their respective target orientations, reflect the input light beam along the target output path.

Example 2. The apparatus of example 1, wherein the controller is configured to: issue a first control signal to the first mirror, to steer the first mirror in accordance with the target orientation of the first mirror; and issue a second control signal to the second mirror, to steer the second mirror in accordance with the target orientation of the second mirror; wherein the first and second mirrors are configured to steer in accordance with the first control signal and the second control signal, respectively, such that (i) the first mirror reflects the input light beam as a target intermediate light beam along the target intermediate path, and (ii) the second mirror reflects the target intermediate light beam along the target output path.

Example 3. The apparatus of any one of examples 1-2, wherein: the angle of the output light beam measured by the angle sensor is a first angle of the output light beam with respect to an angle sensing plane; and the controller is configured to convert the first angle of the output light beam to a second angle of the output light beam with respect to an output plane.

Example 4. The apparatus of any one of examples 1-3, wherein: the centration of the input light beam measured by the centration sensor is first centration of the input light beam with respect to a centration sensing plane; and the controller is configured to, based at least in part on the measured angle of the output light beam, convert the first centration of the input light beam to a second centration of the input light beam with respect to an input plane.

Example 5. The apparatus of any one of examples 1-4, wherein to determine the input path of the input light beam, the controller is configured to: based at least in part on the measured angle of the output light beam, determine an angle of the input light beam with respect to an input plane; and based at least in part on the angle of the input light beam with respect to the input plane and the measured centration of the input light beam, determine the input path of the input light beam.

Example 6. The apparatus of example 5, wherein to determine the angle of the input light beam with respect to the input plane, the controller is configured to: determine reverse propagation of the light beam, so as to determine the angle of the input light beam with respect to the input plane, based at least in part on the measured angle of the output light beam.

Example 7. The apparatus of any one of examples 5-6, wherein to determine the target intermediate path, the controller is configured to: determine a first position of the input path on the first mirror; determine a reverse propagation of the target output path, to determine a second position of the target output path on the second mirror; and determine the target intermediate path to be between the first position and the second position.

Example 8. The apparatus of any one of examples 1-7, wherein to determine the target orientation of the first mirror, the controller is configured to: based at least in part on the input path of the input light beam and the target intermediate path, determine the target orientation of the first mirror, such that a line normal to the target orientation of the first mirror bisects an angle between the input path and the target intermediate path.

Example 9. The apparatus of any one of examples 1-8, wherein to determine the target orientation of the second mirror, the controller is configured to: based at least in part on the target intermediate path and the target output path, determine the target orientation of the second mirror, such that a line normal to the target orientation of the second mirror bisects an angle between the target intermediate path and the target output path.

Example 10. The apparatus of any one of examples 1-9, wherein one of both of the first and second mirrors are fast steering mirrors (FSM).

Example 11. A folded optical system comprising the apparatus of any one of examples 1-10.

Example 12. A method comprising: reflecting, by a first mirror, an input light beam as an intermediate light beam; reflecting, by a second mirror, the intermediate light beam as an output light beam; measuring, by an angle sensor, an angle of the output light beam; measuring, by a centration sensor, a centration of the input light beam; and based at least in part on measurements from the centration sensor and the angle sensor, estimating an input path of the input light beam; based at least in part on the determined input path of the input light beam and a target output path, determining a target intermediate path; and based at least in part on the target intermediate path, determining target orientations of the first mirror and second mirror, such that the first and second mirrors, when steered to the respective target orientations, reflect the input light beam along the target output path.

Example 13. The method of example 12, comprising: issuing a first control signal to the first mirror, to steer the first mirror in accordance with the target orientation of the first mirror; issuing a second control signal to the second mirror, to steer the second mirror in accordance with the target orientation of the second mirror; and steering, by the first and second mirrors, in accordance with the first control signal and the second control signal, respectively, such that (i) the first mirror reflects the input light beam as a target intermediate light beam along the target intermediate path, and (ii) the second mirror reflects the target intermediate light beam along the target output path.

Example 14. The method of any one of examples 12-13, wherein: the angle of the output light beam measured by the angle sensor is a first angle of the output light beam with respect to an angle sensing plane; and the method comprises converting the first angle of the output light beam to a second angle of the output light beam with respect to an output plane.

Example 15. The method of any one of examples 12-14, wherein: the centration of the input light beam measured by the centration sensor is a first centration of the input light beam with respect to a centration sensing plane; and the method further comprises based at least in part on the measured angle of the output light beam, converting the first centration of the input light beam to a second centration of the input light beam with respect to an input plane.

Example 16. The method of any one of examples 12-15, estimating the input path of the input light beam comprises: based at least in part on the measured angle of the output light beam, estimating an angle of the input light beam with respect to an input plane; and based at least in part on the angle of the input light beam with respect to the input plane and the measured centration of the input light beam, estimating the input path of the input light beam; wherein determining the target intermediate path comprises determining a first position of the input path on the first mirror; determining a second position of the target output path on the second mirror; and determining the target intermediate path to be between the first position and the second position.

Example 17. The method of any one of examples 12-15, wherein determining target orientations of the first mirror and second mirror comprises: based at least in part on the input path of the input light beam and the target intermediate path, determining the target orientation of the first mirror, such that a line normal to the target orientation of the first mirror bisects an angle between the input path and the target intermediate path; and based at least in part on the target intermediate path and the target output path, determining the target orientation of the second mirror, such that a line normal to the target orientation of the second mirror bisects an angle between the target intermediate path and the target output path.

Example 18. An optical system comprising: a first mirror and a second mirror configured to reflect an input light beam as an output light beam; an angle sensor configured to measure an angle of the output light beam; a centration sensor configured to measure a centration of the input light beam, and a controller configured to based at least in part on the measured angle of the output light beam, determine an angle of the input light beam with respect to an input plane; and based at least in part on the angle of the input light beam with respect to the input plane and the measured centration of the input light beam, determine an input path of the input light beam.

Example 19. The optical system of example 18, wherein the controller is configured to: based at least in part on the determined input path of the input light beam and a target output path, determine a target intermediate path between the first and second mirrors; and based at least in part on the target intermediate path, determine target orientations of the first mirror and second mirror, such that the first and second mirrors, when steered to the respective target orientations, reflect the input light beam along the target output path.

Example 20. The optical system of example 19, wherein the controller is configured to: issue a first control signal to the first mirror, to steer the first mirror in accordance with the target orientation of the first mirror; and issue a second control signal to the second mirror, to steer the second mirror in accordance with the target orientation of the second mirror; wherein the first and second mirrors are configured to steer in accordance with the first control signal and the second control signal, respectively, such that (i) the first mirror reflects the input light beam as a target intermediate light beam along the target intermediate path, and (ii) the second mirror reflects the target intermediate light beam along the target output path.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An apparatus comprising:
a first mirror configured to reflect an input light beam as an intermediate light beam;
a second mirror configured to reflect the intermediate light beam as an output light beam;
an angle sensor configured to measure an angle of the output light beam;
a centration sensor configured to measure a centration of the input light beam; and
a controller configured to
determine, based at least in part on measurements from the centration sensor and the angle sensor, an input path of the input light beam,
determine, based at least in part on the determined input path of the input light beam and a target output path, a target intermediate path, and
determine, based at least in part on the target intermediate path, a target orientation of the first mirror and a target orientation of the second mirror, such that the first and second mirrors, when steered to their respective target orientations, reflect the input light beam along the target output path.

2. The apparatus of claim 1, wherein the controller is configured to:
issue a first control signal to the first mirror, to steer the first mirror in accordance with the target orientation of the first mirror; and
issue a second control signal to the second mirror, to steer the second mirror in accordance with the target orientation of the second mirror;
wherein the first and second mirrors are configured to steer in accordance with the first control signal and the second control signal, respectively, such that (i) the first mirror reflects the input light beam as a target intermediate light beam along the target intermediate path, and (ii) the second mirror reflects the target intermediate light beam along the target output path.

3. The apparatus of claim 1, wherein:
the angle of the output light beam measured by the angle sensor is a first angle of the output light beam with respect to an angle sensing plane; and
the controller is configured to convert the first angle of the output light beam to a second angle of the output light beam with respect to an output plane.

4. The apparatus of claim 1, wherein:
the centration of the input light beam measured by the centration sensor is a first centration of the input light beam with respect to a centration sensing plane; and
the controller is configured to, based at least in part on the measured angle of the output light beam, convert the first centration of the input light beam to a second centration of the input light beam with respect to an input plane.

5. The apparatus of claim 1, wherein to determine the input path of the input light beam, the controller is configured to:
based at least in part on the measured angle of the output light beam, determine an angle of the input light beam with respect to an input plane; and
based at least in part on the angle of the input light beam with respect to the input plane and the measured centration of the input light beam, determine the input path of the input light beam.

6. The apparatus of claim 5, wherein to determine the angle of the input light beam with respect to the input plane, the controller is configured to:

determine reverse propagation of the light beam, so as to determine the angle of the input light beam with respect to the input plane, based at least in part on the measured angle of the output light beam.

7. The apparatus of claim 5, wherein to determine the target intermediate path, the controller is configured to:

determine a first position of the input path on the first mirror;

determine a reverse propagation of the target output path, to determine a second position of the target output path on the second mirror; and determine the target intermediate path to be between the first position and the second position.

8. The apparatus of claim 1, wherein to determine the target orientation of the first mirror, the controller is configured to:

based at least in part on the input path of the input light beam and the target intermediate path, determine the target orientation of the first mirror, such that a line normal to the target orientation of the first mirror bisects an angle between the input path and the target intermediate path.

9. The apparatus of claim 1, wherein to determine the target orientation of the second mirror, the controller is configured to:

based at least in part on the target intermediate path and the target output path, determine the target orientation of the second mirror, such that a line normal to the target orientation of the second mirror bisects an angle between the target intermediate path and the target output path.

10. The apparatus of claim 1, wherein one of both of the first and second mirrors are fast steering mirrors (FSM).

11. The apparatus of claim 1, wherein the first and second mirrors steer the input beam in a folded path that has an S-like or Z-like shape.

12. A method comprising:

reflecting, by a first mirror, an input light beam as an intermediate light beam;

reflecting, by a second mirror, the intermediate light beam as an output light beam;

measuring, by an angle sensor, an angle of the output light beam;

measuring, by a centration sensor, a centration of the input light beam; and based at least in part on measurements from the centration sensor and the angle sensor, estimating an input path of the input light beam;

based at least in part on the determined input path of the input light beam and a target output path, determining a target intermediate path; and based at least in part on the target intermediate path, determining target orientations of the first mirror and second mirror, such that the first and second mirrors, when steered to the respective target orientations, reflect the input light beam along the target output path.

13. The method of claim 12, comprising:

issuing a first control signal to the first mirror, to steer the first mirror in accordance with the target orientation of the first mirror;

issuing a second control signal to the second mirror, to steer the second mirror in accordance with the target orientation of the second mirror; and steering, by the first and second mirrors, in accordance with the first control signal and the second control signal, respectively, such that (i) the first mirror reflects the input light beam as a target intermediate light beam along the target intermediate path, and (ii) the second mirror reflects the target intermediate light beam along the target output path.

14. The method of claim 12, wherein:

the angle of the output light beam measured by the angle sensor is a first angle of the output light beam with respect to an angle sensing plane; and the method comprises converting the first angle of the output light beam to a second angle of the output light beam with respect to an output plane.

15. The method of claim 12, wherein:

the centration of the input light beam measured by the centration sensor is a first centration of the input light beam with respect to a centration sensing plane; and the method further comprises based at least in part on the measured angle of the output light beam, converting the first centration of the input light beam to a second centration of the input light beam with respect to an input plane.

16. The method of claim 12, estimating the input path of the input light beam comprises:

based at least in part on the measured angle of the output light beam, estimating an angle of the input light beam with respect to an input plane; and based at least in part on the angle of the input light beam with respect to the input plane and the measured centration of the input light beam, estimating the input path of the input light beam;

wherein determining the target intermediate path comprises determining a first position of the input path on the first mirror;

determining a second position of the target output path on the second mirror; and determining the target intermediate path to be between the first position and the second position.

17. The method of claim 12, wherein determining target orientations of the first mirror and second mirror comprises:

based at least in part on the input path of the input light beam and the target intermediate path, determining the target orientation of the first mirror, such that a line normal to the target orientation of the first mirror bisects an angle between the input path and the target intermediate path; and based at least in part on the target intermediate path and the target output path, determining the target orientation of the second mirror, such that a line normal to the target orientation of the second mirror bisects an angle between the target intermediate path and the target output path.

18. An optical system comprising:

a first mirror and a second mirror configured to reflect an input light beam as an output light beam;

an angle sensor configured to measure an angle of the output light beam;

a centration sensor configured to measure a centration of the input light beam, and a controller configured to based at least in part on the measured angle of the output light beam, determine an angle of the input light beam with respect to an input plane; and based at least in part on the angle of the input light beam with respect to the input plane and the measured centration of the input light beam, determine an input path of the input light beam.

19. The optical system of claim 18, wherein the controller is configured to:

based at least in part on the determined input path of the input light beam and a target output path, determine a target intermediate path between the first and second mirrors; and based at least in part on the target intermediate path, determine target orientations of the first mirror and second mirror, such that the first and second mirrors, when steered to the respective target orientations, reflect the input light beam along the target output path.

20. The optical system of claim 19, wherein the controller is configured to:

issue a first control signal to the first mirror, to steer the first mirror in accordance with the target orientation of the first mirror; and issue a second control signal to the second mirror, to steer the second mirror in accordance with the target orientation of the second mirror;

wherein the first and second mirrors are configured to steer in accordance with the first control signal and the second control signal, respectively, such that (i) the first mirror reflects the input light beam as a target intermediate light beam along the target intermediate path, and (ii) the second mirror reflects the target intermediate light beam along the target output path.

* * * * *